(12) United States Patent
Miyauchi et al.

(10) Patent No.: US 7,564,657 B2
(45) Date of Patent: Jul. 21, 2009

(54) MAGNETORESISTIVE DEVICE, THIN FILM MAGNETIC HEAD, HEAD GIMBAL ASSEMBLY AND MAGNETIC DISK UNIT EXHIBITING SUPERIOR MAGNETORESISTIVE EFFECT

(75) Inventors: Daisuke Miyauchi, Chuo-ku (JP); Tomohito Mizuno, Chuo-ku (JP)

(73) Assignee: TDk Corporation, Tokyo (JP)

( * ) Notice: Subject to any disclaimer, the term of this patent is extended or adjusted under 35 U.S.C. 154(b) by 874 days.

(21) Appl. No.: 11/076,966

(22) Filed: Mar. 11, 2005

(65) Prior Publication Data
US 2005/0213262 A1    Sep. 29, 2005

(30) Foreign Application Priority Data
Mar. 25, 2004 (JP) .............................. 2004-090155
Apr. 9, 2004 (JP) .............................. 2004-115436

(51) Int. Cl.
*G11B 5/33* (2006.01)
(52) U.S. Cl. .................................................. 360/324.1
(58) Field of Classification Search ....................... None
See application file for complete search history.

(56) References Cited
U.S. PATENT DOCUMENTS

| | | | |
|---|---|---|---|
| 6,226,159 B1 | 5/2001 | Pinarbasi | |
| 7,295,409 B2 * | 11/2007 | Hasegawa et al. | 360/324.12 |
| 2002/0051380 A1 | 5/2002 | Kamiguchi et al. | |
| 2003/0011944 A1 | 1/2003 | Hosomi | |
| 2003/0090844 A1 | 5/2003 | Shimizu et al. | |
| 2005/0018366 A1 * | 1/2005 | Sbiaa et al. | 360/324.11 |

FOREIGN PATENT DOCUMENTS

| | | |
|---|---|---|
| JP | A 2001-052317 | 2/2001 |
| JP | A 2002-092826 | 3/2002 |
| JP | A 2002-359412 | 12/2002 |
| JP | A 2003/152239 | 5/2003 |
| JP | 2003/298142 | * 10/2003 |
| JP | A 2003-298142 | 10/2003 |

OTHER PUBLICATIONS

Vouille et al., "Microscopic Mechanisms of Giant Magnetoresistance," *The American Physical Society: Physical Review*, vol. 60, No. 9, pp. 6710-6722 {Sep. 1, 1999}.

* cited by examiner

*Primary Examiner*—David D Davis
(74) *Attorney, Agent, or Firm*—Oliff & Berridge, PLC

(57) ABSTRACT

Provided are a magnetoresistive device capable of obtaining a larger amount of resistance change and responding to a higher recording density and a thin film magnetic head comprising the magnetoresistive device. A first magnetization fixed film and a second magnetization fixed film have magnetization directions antiparallel to each other, and the second magnetization fixed film farther from a magnetization free layer is made of, for example, a material including at least one selected from the group consisting of tantalum (Ta), chromium (Cr) and vanadium (V), and has a bulk scattering coefficient of 0.25 or less. Thereby, a bulk scattering effect by the second magnetization fixed film which has a function of canceling out the amount of resistance change between the magnetization free layer and the first magnetization fixed film can be prevented, and a magnetoresistive ratio $\Delta R/R$ can be improved, and recorded magnetic information with a higher recording density can be read out.

20 Claims, 12 Drawing Sheets

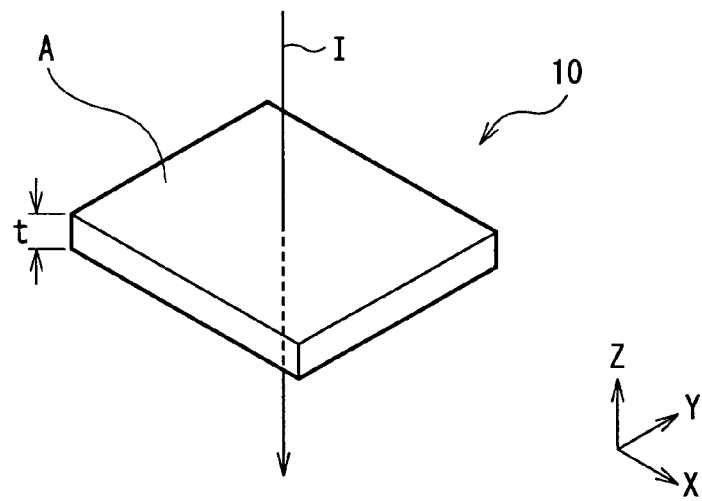
FIG. 7
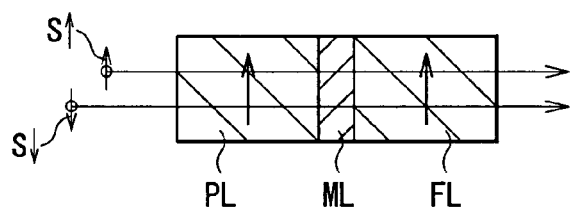
FIG. 8A                             LOW RESISTANCE STATE
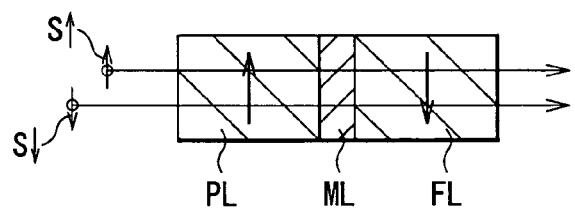
FIG. 8B                             HIGH RESISTANCE STATE

LOW RESISTANCE STATE

HIGH RESISTANCE STATE

MAGNETORESISTIVE DEVICE, THIN FILM MAGNETIC HEAD, HEAD GIMBAL ASSEMBLY AND MAGNETIC DISK UNIT EXHIBITING SUPERIOR MAGNETORESISTIVE EFFECT

BACKGROUND OF THE INVENTION

1. Field of the Invention

The present invention relates to a magnetoresistive device exhibiting a giant magnetoresistive effect, a thin film magnetic head, a head gimbal assembly and a magnetic disk unit comprising the magnetoresistive device, and more specifically the invention related to a magnetoresistive device in which a current flows in a laminate direction during use, and a thin film magnetic head, a head gimbal assembly and a magnetic disk unit comprising the magnetoresistive device.

2. Description of the Related Art

Conventionally, thin film magnetic heads comprising a MR device which exhibits a magnetoresistive effect (MR) are broadly used to reproduce information on magnetic recording media such as hard disks. In recent years, as the recording densities of the magnetic recording media increase, thin film magnetic heads using a giant magnetoresistive device (GMR device) which exhibits a giant magnetoresistive effect (GMR) are typically used. As such a GMR device, for example, a spin-valve (SV) type GMR device is cited.

The SV type GMR device comprises a SV film with a structure in which a magnetic layer (magnetization fixed layer) of which the magnetization direction is fixed in a predetermined direction and a magnetic layer (magnetization free layer) of which the magnetization direction changes depending upon an external signal magnetic field are laminated with a non-magnetic intermediate layer in between, and at the time of reproducing, a sense current flows through the SV type GMR device in an in-plane direction of a laminate. Such a GMR device is specifically called a CIP (Current in Plane)-GMR device. In this case, when a sense current flows depending upon a relative angle between the magnetization directions of two magnetic layers (that is, the magnetization fixed layer and the magnetization free layer) in the SV film, electrical resistance (that is, voltage) changes.

Recently, in order to respond to a further improvement in the recording density, the development of thin film magnetic heads comprising a CPP (Current Perpendicular to the Plane)-GMR device with a structure in which at the time of reproducing, a sense current flows in a laminate direction of the SV film has been pursued. Typically, such a CPP-GMR device comprises a SV film, a pair of magnetic domain control films which face each other so that the SV film is sandwiched therebetween with an insulating film in between in a direction corresponding to a reproducing track width direction, and a top electrode and a bottom electrode which are formed so that the SV film and the pair of magnetic domain control film are sandwiched therebetween in a laminate direction. The top electrode and the bottom electrode also serve as a top shield film and a bottom shield film, respectively. The CPP-GMR device with such a structure has an advantage that in the case where the dimension in a reproducing track width is reduced, the CPP-GMR device has a higher output than the CIP-GMR device. More specifically, in the CIP-GMR device, a sense current flows in a in-plane direction, so a magnetic sensitive portion where a sense current passes becomes minute with a decrease in the dimension in a reproducing track width direction, thereby the amount of voltage change is reduced. On the other hand, in CPP-GMR device, a sense current flows in a laminate direction, so a reduction in the dimension in a reproducing track width direction has a less influence on the amount of voltage change. Against such a background, expectations on the CPP-GMR device as a device capable of responding to a further improvement in the recording density expand.

Specifically, when a magnetization fixed layer has a three-layer synthetic structure including two ferromagnetic films (a first ferromagnetic film and a second ferromagnetic film) having magnetization directions fixed in antiparallel to each other and a non-magnetic film disposed between the ferromagnetic films, the net moment of the magnetization fixed layer is reduced, thereby even if an external magnetic field is applied, it is difficult to rotate the magnetization direction of the magnetization fixed layer, and antiferromagnetic coupling between two ferromagnetic films occurs, so the magnetization direction of the magnetization fixed layer is stabilized. In addition, when the net moment is reduced, a magnetostatic field in a magnetic head is reduced, and the symmetry of an output waveform is improved. A synthetic type CPP-GMR device comprising such a synthetic type magnetization fixed layer can deliver superior performance as a means for reproducing magnetically recorded information.

As a related art of the CPP-GMR device, for example, a CPP-GMR device comprising a magnetization free layer or a magnetization fixed layer with a multilayer structure in which ferromagnetic films and non-magnetic films are alternately laminated is disclosed (for example, refer to Japanese Unexamined Patent Application Publication No. 2002-092826). The CPP-GMR device has such a multilayer structure so as to improve a spin-dependent scattering effect and obtain a large output. Moreover, a CIP-GMR device comprising a synthetic type magnetization fixed layer in which at least one of two magnetization fixed films constituting the synthetic type magnetization fixed layer has a multi-structure including an intermediate layer made of a nickel iron alloy (NiFe) (more specifically a structure of "cobalt (Co)/NiFe/cobalt (Co)") is disclosed in Japanese Unexamined Patent Application Publication No. 2001-052317. In this case, when a ferromagnetic coupling magnetic field between a free layer and a magnetization fixed layer is reduced, a high magnetoresistive ratio can be obtained. Moreover, a synthetic type CPP-GMR device using a material with a negative bulk scattering coefficient $\beta$ in at least one of a free layer and a magnetization fixed layer, and a material with a negative interface scattering coefficient $\gamma$ in a non-magnetic intermediate layer sandwiched between the free layer and the magnetization fixed layer is disclosed in Japanese Unexamined Patent Application Publication No. 2003-298142. Such a structure is used to obtain a larger magnetoresistive ratio.

However, a conventional synthetic type CPP-GMR device has a structure in which the magnetizations of a first magnetization fixed layer and a second magnetization fixed layer are coupled in antiparallel to each other, so the net moment is reduced to stabilize the magnetization direction. On the other hand, a current flows through the SV film in a laminate direction, so there is a problem that a part of the amount of resistance change is lost due to the structural characteristics. In other words, the amount of resistance change (the amount of voltage change) by a GMR effect occurring between the first magnetization fixed film and the magnetization free layer and the amount of resistance change (the amount of voltage change) by a GMR effect occurring between the second magnetization fixed film having a magnetization direction opposite to the magnetization direction of the first magnetization fixed film and the magnetization free layer partially cancel each other out. In the description, an effect that the second magnetization fixed film increases the amount of resistance change is called "a positive resistance change", and an effect that the second magnetization fixed film cancels the amounts of resistance change out is called "a negative resistance change".

SUMMARY OF THE INVENTION

In view of the foregoing, it is an object of the invention to provide a magnetoresistive device capable of obtaining a larger amount of resistance change and responding to an increase in recording density, and a thin film magnetic head, a head gimbal assembly and a magnetic disk unit comprising the magnetoresistive device.

A magnetoresistive device according to a first aspect of the invention comprises: a first magnetization fixed layer including a first magnetization fixed film having a magnetization direction fixed in a predetermined direction and a second magnetization fixed film being antiferromagnetically coupled to the first magnetization fixed film and having a bulk scattering coefficient of 0.25 or less; a magnetization free layer being disposed on a side of the first magnetization fixed film opposite to a side where the second magnetization fixed film is disposed, and having a magnetization direction changing depending upon an external magnetic field; and a current path for flowing a sense current through the first magnetization fixed layer and the magnetization free layer in a direction perpendicular to a laminate surface. A thin film magnetic head according to a first aspect of the invention comprises the above-described magnetoresistive device, and a head gimbal assembly according to a first aspect of the invention comprises: a magnetic head slider including such a thin film magnetic head on a side of the magnetic head slider; and a suspension to which the magnetic head slider is attached at an end thereof. Moreover, a magnetic disk unit according to a first aspect of the invention comprises: a magnetic recording medium; and a head arm assembly including the above-described head gimbal assembly and an arm supporting the other end of the above-described suspension.

In the magnetoresistive device, the thin film magnetic head, the head gimbal assembly and the magnetic disk unit according to the first aspect of the invention, the second magnetization fixed film farther from the magnetization free layer out of the first magnetization fixed film and the second magnetization fixed film has a bulk scattering coefficient of 0.25 or less, so a bulk scattering effect by the second magnetization fixed film which has a function of canceling out the amount of resistance change between the magnetization free layer and the first magnetization fixed film can be prevented.

In the magnetoresistive device, the thin film magnetic head, the head gimbal assembly and the magnetic disk unit according to the first aspect of the invention, the second magnetization fixed film preferably has a bulk scattering effect of 0.20 or less.

A magnetoresistive device according to a second aspect of the invention comprises: a first magnetization fixed layer including a first magnetization fixed film having a magnetization direction fixed in a predetermined direction and a second magnetization fixed film being antiferromagnetically coupled to the first magnetization fixed film and including at least one selected from the group consisting of tantalum (Ta), chromium (Cr) and vanadium (V); a magnetization free layer being disposed on a side of the first magnetization fixed film opposite to a side where the second magnetization fixed film is disposed, and having a magnetization direction changing depending upon an external magnetic field; and a current path for flowing a sense current through the first magnetization fixed layer and the magnetization free layer in a direction perpendicular to a laminate surface. In this case, the second magnetization fixed film preferably has a bulk scattering coefficient of 0.25 or less, more specifically 0.20 or less. A thin film magnetic head according to a second aspect of the invention comprises the above-described magnetoresistive device, and a head gimbal assembly according to a second aspect of the invention comprises: a magnetic head slider including such a thin film magnetic head on a side of the magnetic head slider; and a suspension to which the magnetic head slider is attached to an end thereof. Moreover, a magnetic disk unit according to a second aspect of the invention comprises: a magnetic recording medium; and a head arm assembly including the above-described head gimbal assembly and an arm supporting the other end of the above-described suspension.

In the magnetoresistive device, the thin film magnetic head, the head gimbal assembly and the magnetic disk unit according to the second aspect of the invention, the second magnetization fixed film farther from the magnetization free layer out of the first magnetization fixed film and the second magnetization fixed film includes at least one selected from the group consisting of tantalum (Ta), chromium (Cr) and vanadium (V), so a bulk scattering effect by the second magnetization fixed film which has a function of canceling out the amount of resistance change between the magnetization free layer and the first magnetization fixed film can be prevented.

In the magnetoresistive device, the thin film magnetic head, the head gimbal assembly and the magnetic disk unit according to the first and the second aspects of the invention, it is preferable that the tantalum content is within a range of 1 atomic percent to 11.8 atomic percent inclusive of the second magnetization fixed film, the chromium content is within a range of 13 atomic percent to 26.5 atomic percent inclusive of the second magnetization fixed film, and the vanadium content is within a range of 13 atomic percent to 29.4 atomic percent inclusive of the second magnetization fixed film. The second magnetization fixed film can further include at least one selected from the group consisting of iron (Fe), cobalt (Co), nickel (Ni) and manganese (Mn). In this case, the composition ratio between cobalt and iron is, for example, 9:1.

In the magnetoresistive device, the thin film magnetic head, the head gimbal assembly and the magnetic disk unit according to the first and the second aspects of the invention, the first magnetization fixed film and the second magnetization fixed film are preferably exchange coupled to each other through the first non-magnetic film. Moreover, an antiferromagnetic layer which fixes the magnetization direction of the second magnetization fixed film is preferably disposed on a side of the second magnetization fixed film opposite to a side where the first magnetization fixed film is disposed. Further, an intermediate layer is disposed between the first magnetization fixed layer and the magnetization free layer. The current path includes, for example, a first electrode layer and a second electrode layer facing each other with the magnetization fixed layer and the magnetization free layer in between in a direction perpendicular to a laminate surface.

In the magnetoresistive device, the thin film magnetic head, the head gimbal assembly and the magnetic disk unit according to the first and the second aspects of the invention, the second magnetization fixed film preferably includes at least one chromium (Cr) film with a thickness of 0.1 nm to 0.5 nm inclusive. Moreover, it is preferable that in the second magnetization fixed film, a plurality of chromium (Cr) films and a plurality of ferromagnetic films are alternately laminated, and the plurality of ferromagnetic films are one of cobalt iron alloy (CoFe) films, cobalt (Co) films and iron chromium alloy (FeCr) films. At least one of the first magnetization fixed film and the magnetization free layer preferably includes at least one cupper (Cu) film. In this case, the copper (Cu) film preferably has a thickness of 0.1 nm to 0.5 nm inclusive. Further, a second magnetization fixed layer in which a third magnetization fixed film, a second non-magnetic film and a fourth magnetization fixed film are laminated in order from the magnetization free layer may be included so as to face the first magnetization fixed layer with the magnetization free layer in between.

The magnetoresistive device, the thin film magnetic head, the head gimbal assembly and the magnetic disk unit according to the first aspect of the invention comprises: a first magnetization fixed layer including a first magnetization fixed film having a magnetization direction fixed in a predetermined direction and a second magnetization fixed film being antiferromagnetically coupled to the first magnetization fixed film and having a bulk scattering coefficient of 0.25 or less; the magnetization free layer being disposed on a side of the first magnetization fixed film opposite to a side where the second magnetization fixed film is disposed and having a magnetization direction changing depending upon an external magnetic field; and the current path for flowing a sense current through the first magnetization fixed layer and the magnetization free layer in a direction perpendicular to a laminate surface, so a reduction in the amount of resistance change due to the second magnetization fixed film can be prevented. Therefore, a magnetoresistive ratio can be improved through increasing the amount of resistance change as a whole, and they can respond to a higher recording density. In particular, when the second magnetization fixed film has a bulk scattering coefficient of 0.20 or less, a larger amount of resistance change can be obtained, and they can respond to a further higher recording density.

The magnetoresistive device, the thin film magnetic head, the head gimbal assembly, the magnetic disk unit and a wafer according to the second aspect of the invention comprises: a first magnetization fixed layer including a first magnetization fixed film having a magnetization direction fixed in a predetermined direction, and a second magnetization fixed film being antiferromagnetically coupled to the first magnetization fixed film and including at least one selected from the group consisting of tantalum (Ta), chromium (Cr) and vanadium (V); a magnetization free layer being disposed on a side of the first magnetization fixed film opposite to a side where the second magnetization fixed film is disposed and having a magnetization direction changing depending upon to an external magnetic field; and the current path for flowing a sense current through the first magnetization fixed layer and the magnetization free layer in a direction perpendicular to a laminate surface, so a reduction in the amount of resistance change due to the second magnetization fixed film can be prevented. Therefore, a magnetoresistive ratio can be improved through increasing the amount of resistance change as a whole, and they can respond to a higher recording density.

Other and further objects, features and advantages of the invention will appear more fully from the following description.

BRIEF DESCRIPTION OF THE DRAWINGS

FIG. 7 is an illustration for describing a change in voltage in the case where a sense current flows through an MR device shown in FIG. 5 in a direction perpendicular to a laminate surface;

FIGS. 8A and 8B are conceptual illustrations for describing a change in resistivity by a bulk scattering effect in a typical spin-valve structure;

DETAILED DESCRIPTION OF THE PREFERRED EMBODIMENTS

A preferred embodiment will be described in detail below referring to the accompanying drawings.

At first, referring to FIGS. 1 through 5, the structure of a magnetoresistive device according to an embodiment of the invention, and the structures of a thin film magnetic head, a head gimbal assembly, a head arm assembly, a head stack assembly and a magnetic disk unit comprising the magnetoresistive device will be described below.

Figure 1:
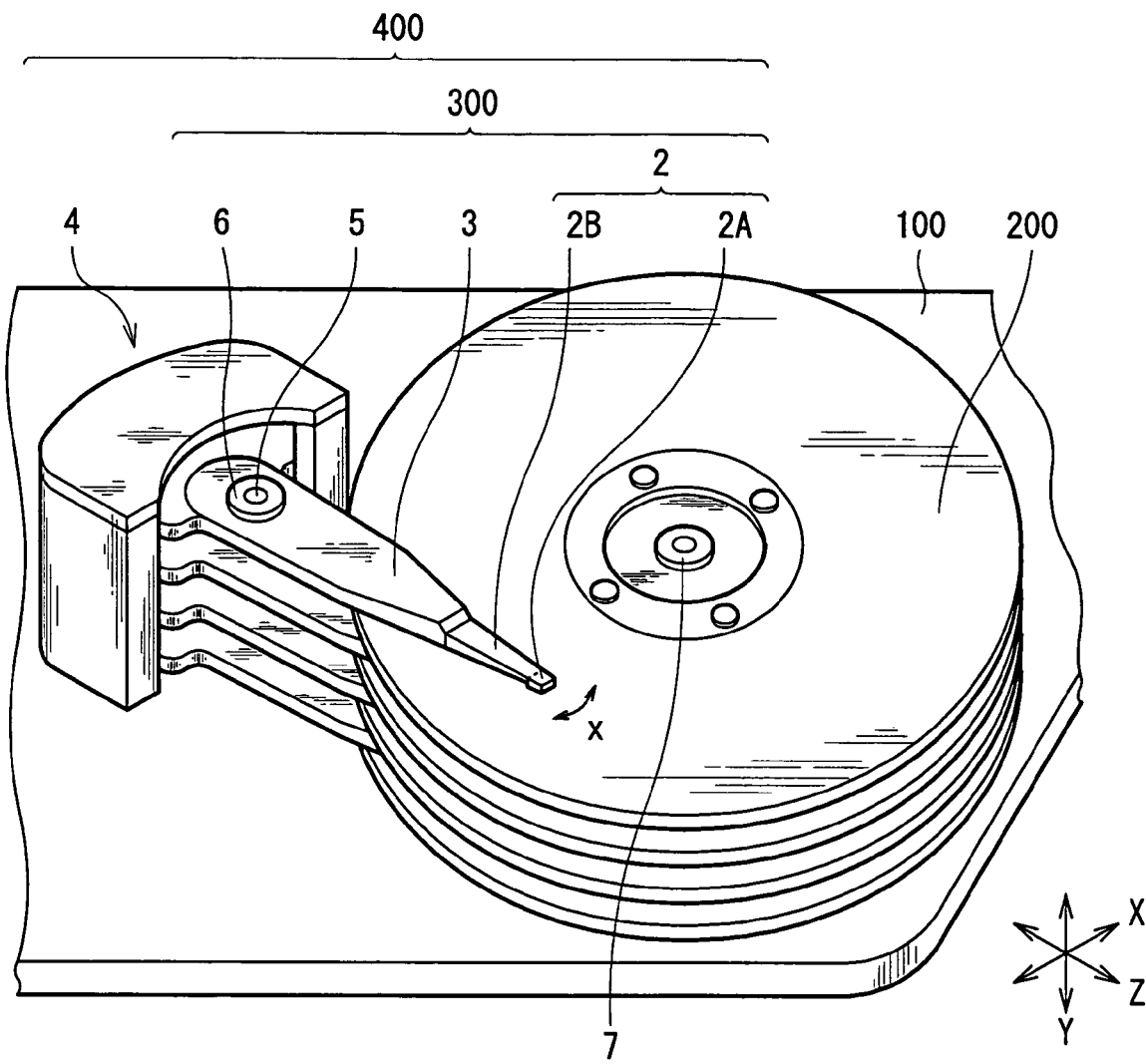
FIG. 1 is a perspective view of an actuator arm comprising a thin film magnetic head according to an embodiment of the invention.

FIG. 1 is a perspective view showing the internal structure of a magnetic disk unit according to an embodiment. As shown in FIG. 1, the magnetic disk unit comprises, for example, magnetic recording media 200 as magnetic recording media on which information is recorded and a head stack assembly (HAS) 400 for recording information on the magnetic recording medium 200 and reproducing the information in an enclosure 100. In the HAS 400, a plurality of head arm assemblies (HAAs) 300 are rotatably supported by a driving portion 4. Each of the plurality of HAAs 300 has a head gimbal assembly (HGA) 2 and an arm 3 supporting the base of the HGA 2. Each HGA 2 comprises a magnetic head slider (hereinafter simply referred to as "slider") 2A including a thin film magnetic head 1 (which will be described later) according to an embodiment on an side surface of the HGA 2, and a suspension 2B to which the slider 2A is attached at an end thereof. The other end of the suspension 2B (an end opposite to the end to which the slider 2A is attached) is supported by an arm 3. Each arm 3 is rotatable around a fixed shaft 5 fixed to the enclosure 100 as a central axis through a bearing 6. The driving portion 4 is made of, for example, a voice coil motor or the like. In general, the magnetic disk unit comprises a plurality of magnetic recording media 200 as shown in FIG. 1, and in the magnetic disk unit, the slider 2A is disposed corresponding to a recording surface (a front surface and a back surface) of each magnetic recording medium 200. Each slider 2A can move in a direction (X direction) across a reproducing track in a plane parallel to the recording surface of each magnetic recording medium 200. On the other hand, the magnetic recording media 200 rotate around a spindle motor 7 fixed to the enclosure 100 in a direction substantially perpendicular to the X direction. Information is recorded or recorded information is read out by the rotation of the magnetic recording media 200 and the movement of the slider 2A.

Figure 2:
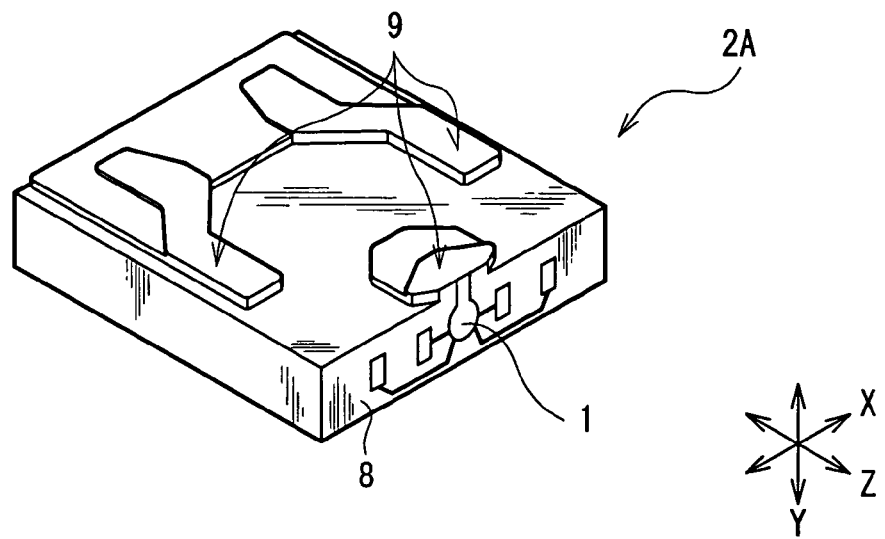
FIG. 2 is a perspective view of a slider in the actuator arm shown in FIG. 1.

FIG. 2 shows the structure of the slider 2A shown in FIG. 1. The slider 2A includes a block-shaped base substrate 8 made of, for example, AlTiC ($Al_2O_3$.TiC). The base substrate 8 is formed in a substantially hexahedral shape, and is disposed so that one surface of the base substrate 8 faces the recording surface of the magnetic recording medium 200 in close proximity. The surface facing the recording surface of the magnetic recording medium 200 is a recording-medium-facing surface (also called air bearing surface) 9, and when the magnetic recording medium 200 rotates, the slider 2A is floated from the recording surface along a direction (Y direction) facing the recording surface by a lift force by an air flow generated between the recording surface and the recording-medium-facing surface 9, thereby a predetermined gap is produced between the recording-medium-facing surface 9 and the magnetic recording medium 200. The thin film magnetic head 1 is disposed on one side surface of the base substrate 8 facing the recording-medium-facing surface 9.

Figure 3:
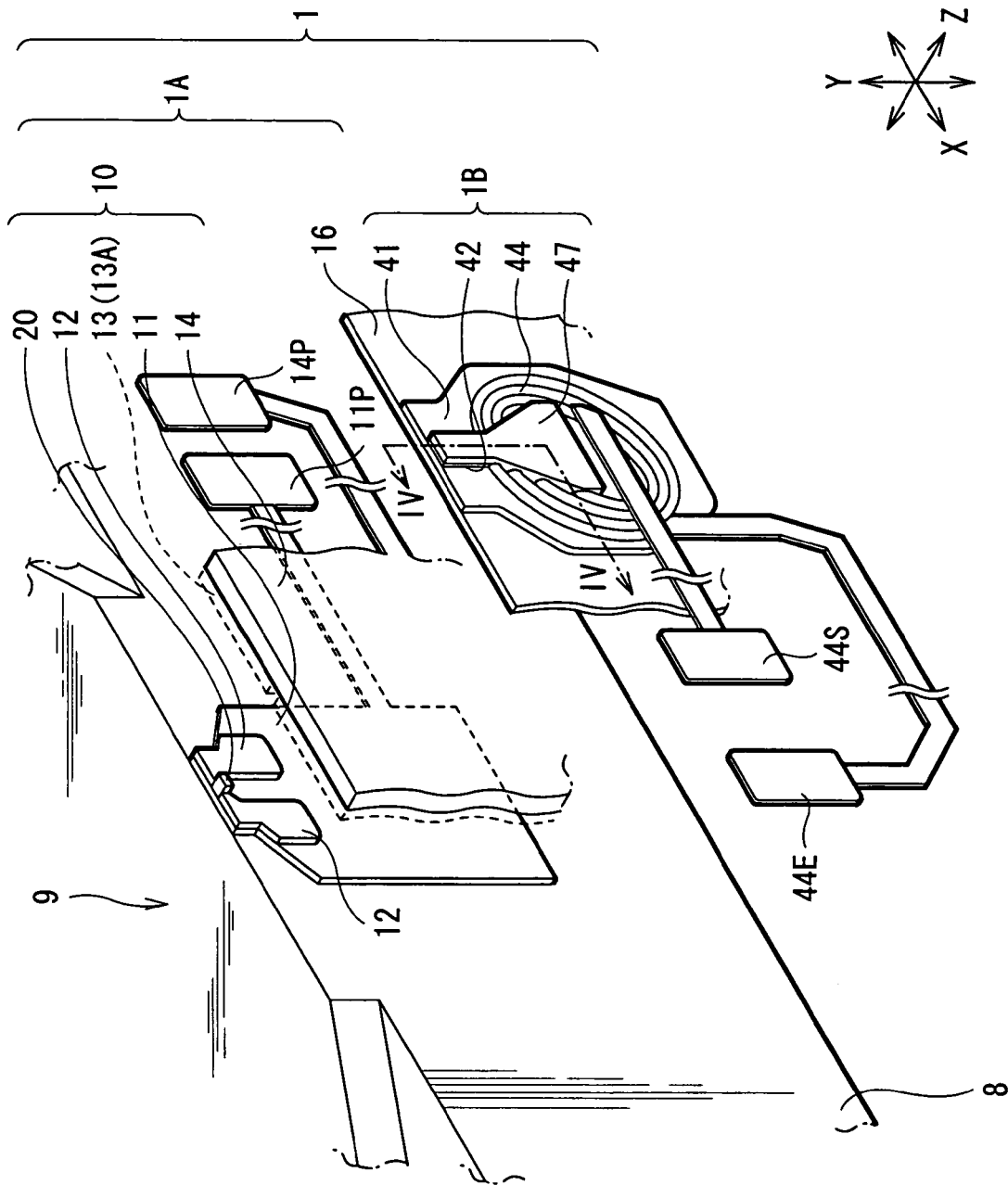
FIG. 3 is an exploded perspective view of the thin film magnetic head according to the embodiment of the invention.
Figure 4:
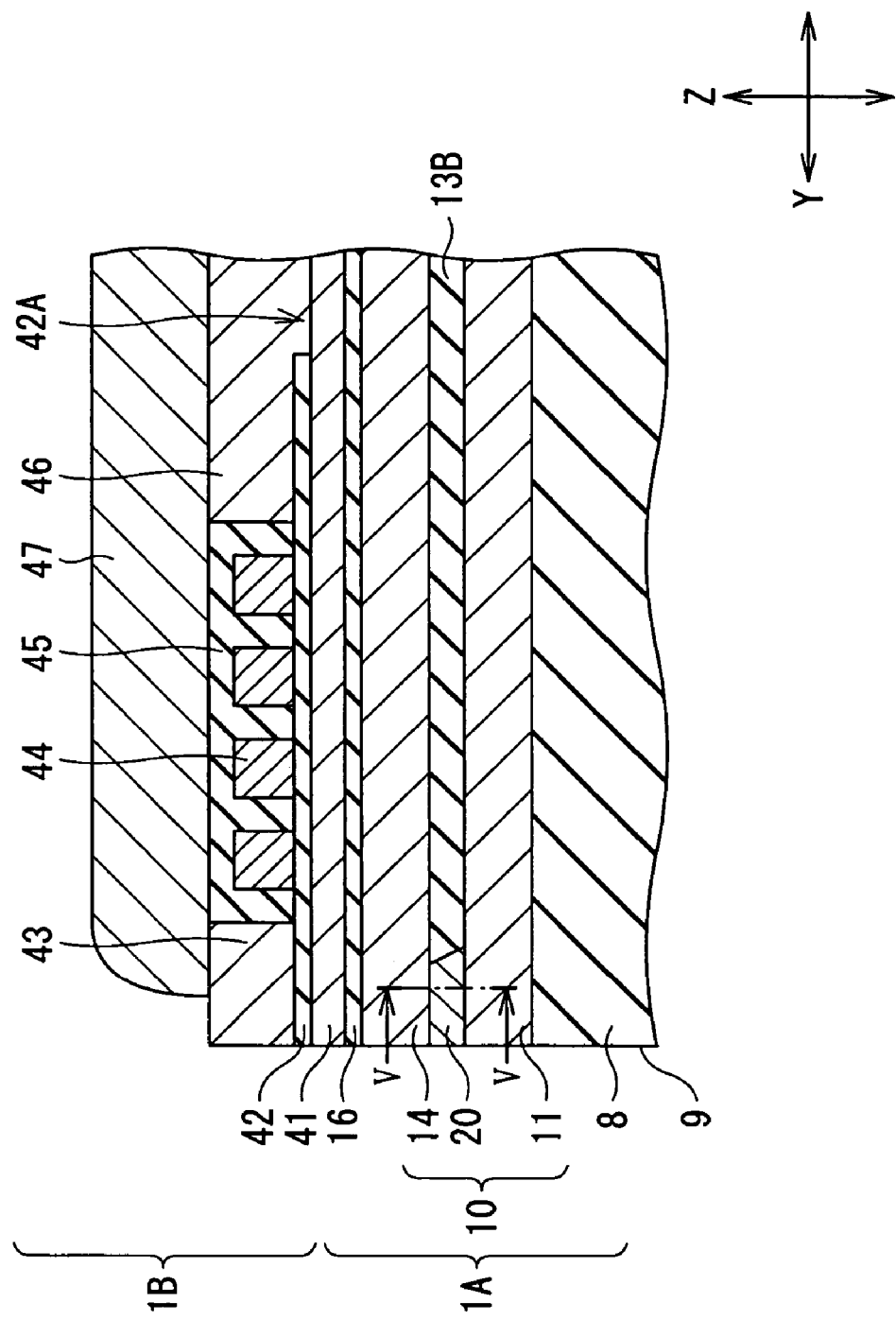
FIG. 4 is a sectional view of the thin film magnetic head taken along a line IV-IV of FIG. 3 from the direction of an arrow.

FIG. 3 shows an exploded perspective view of the thin film magnetic head 1. FIG. 4 shows a sectional view of the thin film magnetic head 1 taken along a line IV-IV of FIG. 3 from the direction of an arrow. As shown in FIGS. 3 and 4, in the thin film magnetic head 1, a reproducing head portion 1A which reproduces magnetic information recorded on the magnetic recording medium 200 and a recording head portion 1B which records magnetic information on the recording track of the magnetic recording medium 200 are combined as one unit.

As shown in FIGS. 3 and 4, the reproducing head portion 1A includes a magnetoresistive device (hereinafter referred to as MR device) 10 with a CPP (Current Perpendicular to the Plane)-GMR (Giant Magnetoresistive) structure in which a sense current flows in a laminate direction. More specifically, in a surface of the MR device 10 which is exposed to the recording-medium-facing surface 9, for example, a bottom electrode 11, a MR film 20, a pair of magnetic domain control films 12, an insulating film 13 and a top electrode 14 are laminated in order on the base substrate 8. As will be described later, a pair of insulating films 15 are disposed each between the pair of magnetic domain control films 12 and the MR film 20 and between the pair of the magnetic domain control films 12 and the bottom electrode 11, although they are not shown in FIGS. 3 and 4. Moreover, the insulating film 13 is disposed around the MR film 20 except for the recording-medium-facing surface 9 in a XY plane, and more specifically, the insulating film 13 includes two portions, that is, a first portion 13A (refer to FIG. 3) facing to sandwich the MR film 20 in a X direction and a second portion 13B (refer to FIG. 4) occupying a region opposite to the recording-medium-facing surface 9 with the MR film 20 in between. For example, the bottom electrode 11 and the top electrode 14 each have a thickness of 1 μm to 3 μm, and are made of a magnetic metal material such as a nickel iron alloy (NiFe). The bottom electrode 11 and the top electrode 14 face each other with the MR film 20 in between in a laminate direction (Z direction), and have a function of preventing an influence of an unnecessary magnetic field on the MR film 20. Moreover, the bottom electrode 11 is connected to a pad 11P, and the top electrode 14 is connected to a pad 14P, thereby the bottom electrode 11 and the top electrode 14 also have a function as a current path for flowing a current through the MR film 20 in a laminate direction (Z direction). The MR film 20 has a synthetic type spin-valve (SV) structure in which a large number of metal films including a magnetic material are laminated, and has a function of reading magnetic information recorded on the magnetic recording medium 200. The pair of magnetic domain control films 12 are disposed so as to face each other with the MR film 20 in between along a direction (X direction) corresponding to the reproducing track width direction of the magnetic recording medium 200. In the reproducing head portion 1A with such a structure, recorded information is read out through the use of a change in electrical resistance of the MR film 20 depending upon a signal magnetic field from the magnetic recording medium 200. The structure of the MR film 20 will be described in more detail later. The insulating film 13 and the insulating layer 16 each have, for example, a thickness of 10 nm to 100 nm, and are made of an insulating material such as aluminum oxide ($Al_2O_3$) or aluminum nitride (AlN). The insulating film 13 is mainly provided to electrically insulate the bottom electrode 11 from the top electrode 14, and the insulating layer 16 is provided to electrically insulate the reproducing head portion 1A from the recording head portion 1B.

Next, the structure of the recording head portion 1B will be described below. As shown in FIGS. 3 and 4, the recording head portion 1B is formed on the insulating layer 16 of the reproducing head portion 1A, and includes a bottom magnetic pole 41, a write gap layer 42, a pole tip 43, a coil 44, an insulating layer 45, a connecting portion 46 and a top magnetic pole 47.

The bottom magnetic pole 41 is made of, for example, a magnetic material such as NiFe, and is formed on the insulating layer 16. The write gap layer 42 is made of an insulating material such as $Al_2O_3$, and is formed on the bottom magnetic pole 41. The write gap layer 42 has an opening 42A for forming a magnetic path in a position corresponding to a central portion of the coil 44 in a XY plane. On the write gap layer 42, the pole tip 43, the insulating layer 45 and the connecting portion 46 are formed in order from the recording-medium-facing surface 9 in the same plane. The coil 44 is buried in the insulating layer 45. The coil 44 is formed around the opening 42A on the write gap layer 42, and is made of, for example, copper (Cu) or gold (Au). Both terminals of the coil 44 are connected to electrodes 44S and 44E. The top magnetic pole 47 is made of, for example, a magnetic material such as NiFe, and is formed on the write gap layer 42, the pole tip 43, the insulating layer 45 and the connecting portion 46 (refer to FIG. 4). The top magnetic pole 47 is in contact with the bottom magnetic pole 41 through the opening 42A, and is magnetically connected to the bottom magnetic pole 41. An overcoat layer (not shown) made of $Al_2O_3$ or the like is formed so as to be laid over the whole top surface of the recording head portion 1B.

In the recording head portion 1B with such a structure, a magnetic flux is generated in a magnetic path which mainly include the bottom magnetic pole 41 and the top magnetic pole 47 by a current flowing through the coil 44, and the magnetic recording medium 200 is magnetized by a signal magnetic field generated near the write gap layer 42 to record information.

Figure 5:
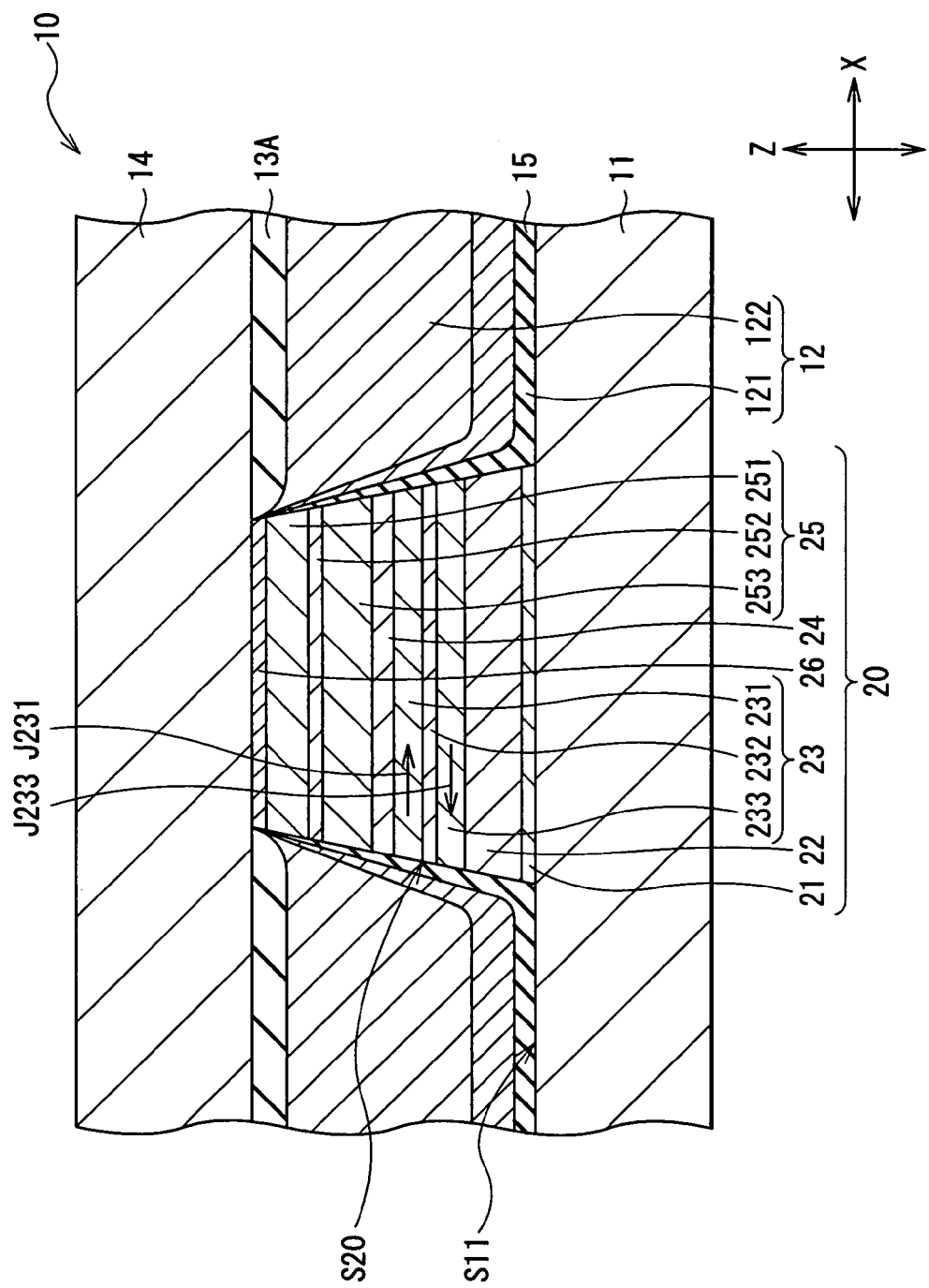
FIG. 5 is a sectional view of a main part of the thin film magnetic head shown in FIG. 4 from the direction of an arrow V.

Next, referring to FIG. 5, the structure of the MR device 10 in the thin film magnetic head 1 according to the embodiment will be described in detail below. FIG. 5 shows a sectional view of the MR device 10 from the direction of an arrow V in FIG. 4.

As shown in FIG. 5, the MR device 10 includes the MR film 20 in which a base layer 21, an antiferromagnetic layer 22, a magnetization fixed layer 23, an intermediate layer 24, a magnetization free layer 25 and a cap layer 26 are laminated in order from the bottom electrode 11. The base layer (also called buffer layer) 21 is made of, for example, tantalum (Ta) or the like with a thickness of 5 nm, and functions to smoothly carry out exchange coupling between the antiferromagnetic layer 22 and the magnetization fixed layer 23 (more specifically, a second magnetization fixed film 233 which will be described later). The antiferromagnetic layer 22 is made of, for example, a material exhibiting antiferromagnetism such as a platinum manganese alloy (PtMn) or an iridium manganese alloy (IrMn) with a thickness of, for example, 7 nm to 15 nm inclusive. The antiferromagnetic layer 22 functions as a so-called pinning layer which fixes the magnetization direction of the magnetization fixed layer 23.

The magnetization fixed layer 23 as a first magnetization fixed layer has a three-layer structure called a so-called synthetic structure, and includes a first magnetization fixed film 231, a second magnetization fixed film 233 and a non-magnetic film 231 disposed between the first magnetization fixed film 231 and the second magnetization fixed film 233. More specifically, the first magnetization fixed film 232 has a magnetization direction J231 fixed in a predetermined direction, and has a thickness of, for example, 3 nm to 4 nm. The second magnetization fixed film 233 has a magnetization direction J233 fixed in a direction opposite to the magnetization direction J231, a bulk scattering coefficient β of 0.25 or less, and a thickness of, for example, 3 nm. Moreover, the non-magnetic film 232 is made of a non-magnetic metal material such as copper, gold, ruthenium (Ru), rhodium (Rh) or iridium (Ir) with a thickness of, for example, 0.8 nm. In this case, the second magnetization fixed film 233 is formed opposite to the magnetization free layer 25 with the first magnetization fixed film 231 in between. The first magnetization fixed film 231 and second magnetization fixed film 233 antiferromagnetically exchange coupled to each other through the non-magnetic film 232, and the magnetization directions J213 and J233 are fixed by the antiferromagnetic layer 22. In this case, the bulk scattering coefficient β of the second magnetization fixed film 233 is preferably 0.20 or less.

The second magnetization fixed film 233 is made of, for example, a ferromagnetic material including at least one selected from the group consisting of iron (Fe), cobalt (Co), nickel (Ni) and manganese (Mn) as a base material. The composition ratio between cobalt and iron is preferably 9:1. Moreover, the second magnetization fixed film 233 includes, for example, at least one selected from the group consisting of tantalum (Ta), chromium (Cr) and vanadium (V) as an added material. In this case, the tantalum content is preferably within a range from 1 atom percent (hereinafter referred to as at %) to 11.8 at % inclusive of the second magnetization fixed film 233. Moreover, the chromium content is preferably within a range of 13 at % to 26.5 at % inclusive of the second magnetization fixed film 233, and the vanadium content is preferably within a range of 13 at % to 29.4 at % inclusive of the second magnetization fixed film 233. The significance of the ranges will be described in examples which will be described later.

Figure 6:
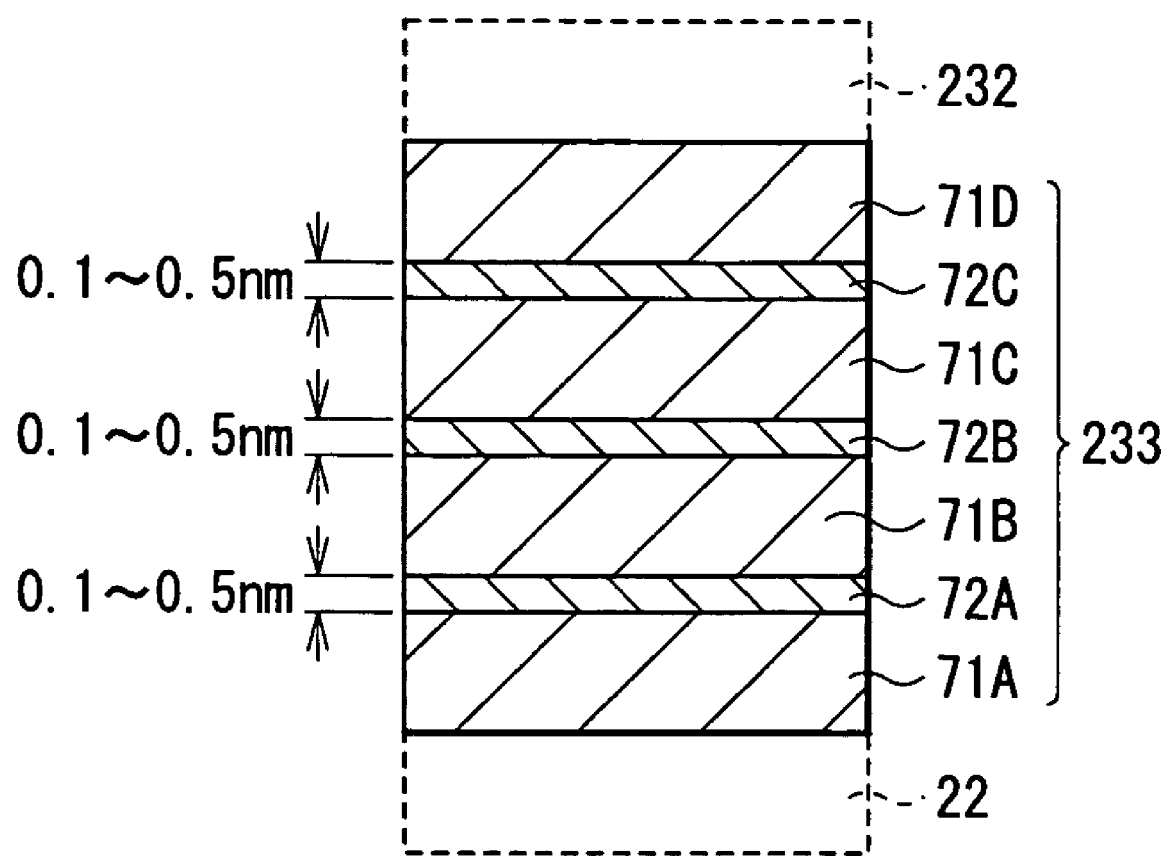
FIG. 6 is a sectional view of a second magnetization fixed film included in the thin film magnetic head shown in FIG. 5.

The second magnetization fixed film 233 may have a single-layer structure or a multilayer structure. For example, the second magnetic fixed film 233 may have a single layer made of a cobalt iron tantalum alloy (CoFeTa), a cobalt iron nickel chromium alloy (CoFeNiCr), a cobalt iron chromium alloy (CoFeCr) or a cobalt iron vanadium alloy (CoFeV), or a structure in which a plurality of single layers made of different components such as CoFe, Ta, NiCr, FeCr, FeV and chromium (Cr) are laminated (for example, "CoFe/Ta", "CoFe/FeCr", "CoFe/FeV", "CoFe/Cr" and the like). FIG. 6 shows a structure in which CoFe films and chromium (Cr) films are alternately laminated as an example of the multilayer structure. FIG. 6 shows a sectional view of the second magnetization fixed film 233 in which a CoFe film 71A, a chromium film 72A, a CoFe film 71B, a chromium film 72B, a CoFe film 71C, a chromium film 72C and a CoFe film 71D are laminated in order from a side in contact with the antiferromagnetic layer 22. In this case, three chromium films are inserted; however, one chromium film, two chromium films or four or more chromium films may be inserted. The composition ratio between cobalt and iron in the CoFe films 71A through 71D is, for example, 9:1. Instead of the CoFe films 71A through 71D, magnetic films including one selected from the group consisting of nickel, iron and cobalt may be used, an additive such as boron (B) may be added. For example, in the case of FeCr, the composition ratio between iron and chromium is 7:3. Thus, when the chromium films 72A through 72C are inserted in the second magnetization fixed film 233, "a positive resistance change" occurs in the second magnetization fixed film 233, so a larger magnetoresistive ratio can be obtained as a whole.

The chromium films 72A through 72C preferably have a thickness of 0.1 nm to 0.5 nm (1 Å to 5 Å) inclusive. When the thickness is less than 0.1 nm, it is difficult to stably manufacture the chromium films 72A through 72C. On the other hand, the upper limit of 0.5 nm is set because of the following reason. Chromium has a first peak of RKKY-like antiferromagnetic coupling, when its thickness is approximately 0.9 nm to 1.0 nm. In this case, the CoFe films 71A through 71D disposed so that the chromium films 72A through 72C are sandwiched therebetween are antiferromagnetically coupled to each other to have antiparallel magnetization directions. Therefore, the effective magnetism of the second magnetization fixed film 233 is weakened, and as a result, there is a tendency that antiferromagnetic coupling to the first magnetization fixed film 231 is lost. Moreover, there is a tendency that the larger the thicknesses of the chromium films 72A through 72C are, the weaker the exchange coupling magnetic field between the first magnetization fixed film 231 and the second magnetization fixed film 233 becomes, and on the other hand, the smaller the thicknesses of the chromium films 72A through 72C are, the stronger the exchange coupling magnetic field between first magnetization fixed film 231 and the second magnetization fixed film 233 becomes. Because of the reason, the chromium films 72A through 72C preferably have a thickness of 0.5 nm or less which is sufficiently thinner than 0.9 nm to 1.0 nm.

As in the case of the second magnetization fixed film 233, the first magnetization fixed layer 231 may have a single-layer structure or a multilayer structure. For example, the first magnetization fixed layer 231 may have a single layer made of CoFe (with a composition ratio of 1:1), or a multilayer structure in which CoFe films and copper films are alternately laminated. As will be described later, a magnetoresistive effect is expected in an interface between a magnetic body and a non-magnetic body, so as described above, when the first magnetization fixed layer 231 has a multilayer structure such as "CoFe/Cu", an improvement in the amount of resistance change by the magnetoresistive effect is expected.

The intermediate layer 24 is made of, for example, a non-magnetic metal material with high electrical conductivity (small electrical resistance) such as copper or gold with a thickness of, for example, 3.2 nm. The intermediate layer 24 has a main function of separating magnetic coupling between the magnetization free layer 25 and the magnetization fixed layer 23 (the first magnetization fixed film 231). A sense current flowing at the time of reading flows from the bottom electrode 11 to the magnetization free layer 25 through the first magnetization fixed film 231 and the intermediate layer 24. At this time, scattering to which the sense current is subjected is required to be minimized, so the intermediate layer 24 is preferably made of the above-described material with small electrical resistance. The magnetization free layer 25 has a magnetization direction which changes depending upon an external magnetic field, and is formed opposite to the second magnetization fixed film 233 with the first magnetization fixed film 231 in between. The magnetization free layer 25 has, for example, a three-layer structure in which a non-magnetic film 252 made of copper or the like is formed between ferromagnetic films 251 and 253 made of a cobalt iron alloy (CoFe), a nickel iron alloy (NiFe) or the like. The ferromagnetic films 251 and 253 have a thickness of, for example, 1.5 nm (15 Å), and the non-magnetic film 252 has a thickness of, for example, 0.3 nm (3 Å). The ferromagnetic films 251 and 253 in the magnetization free layer 25 have a magnetization direction which changes depending upon the direction or the magnitude of an external magnetic field (a signal magnetic field from the magnetic recording medium 200 in the embodiment). The magnetization free layer 25 may have a single-layer structure made of a ferromagnetic material such as a cobalt iron alloy (CoFe) or a nickel iron alloy (NiFe). Further, the cap layer 26 is made of, for example, copper, tantalum or the like with a thickness of 1 nm to 5 nm, and in a manufacturing process, the cap layer 26 has a function of protecting the MR device 10 after the film formation.

Each magnetic domain control film 12 includes a base layer 121 formed on the bottom electrode 11 with the insulating film 15 in between and a magnetic domain control layer 122 formed on the base layer 121. The magnetic domain control films 12 are disposed so as to sandwich the MR film 20 in an X direction (a direction corresponding to a reproducing track width), and apply a longitudinal bias magnetic field to the magnetization free layer 25. More specifically, the base layer 121 is made of, for example, a chromium titanium alloy (CrTi) or tantalum (Ta), and the base layer 121 has a function of improving the growth potential of the magnetic domain control layer 122 in a manufacturing process. The magnetic domain control layer 122 is made of, for example, a cobalt platinum alloy (CoPt) or the like, and had a function of promoting the formation of a single magnetic domain of the magnetization free layer 25 to prevent Barkhausen noises. In this case, the pair of insulating films 15 are disposed each between the pair of magnetic domain control films 12 and the MR film 20, and between the pair of magnetic domain control films 12 and the bottom electrode 11. The pair of insulating films 15 are made of, for example, a material with electrical insulation such as $Al_2O_3$ or AlN, and are formed so as to be continuously laid over an area from both end surfaces S20 of the MR film 20 to a top surface S11 of the bottom electrode 11. Therefore, the pair of magnetic domain control films 12, and the MR film 20 and the bottom electrode 11 are electrically insulated from one another.

As shown in FIG. 5, the bottom electrode 11 and the top electrode 14 faces each other so that the MR film 20 with the above-described structure is sandwiched therebetween in a direction (Z direction) perpendicular to a laminate surface, and when magnetic information on the magnetic recording medium 200 is read out, the bottom electrode 11 and the top electrode 14 functions as a current path for flowing a sense current through the MR film 20 in a Z direction.

Next, the reproducing actions of the MR device 10 formed as described above and the thin film magnetic head 1 will be described below referring to FIGS. 3 through 5.

In the thin film magnetic head 1, the reproducing head portion 1A reads information recorded on the magnetic recording medium 200. When the information is read out, the recording-medium-facing surface 9 faces a recording surface of the magnetic recording medium 200, and in this state, a signal magnetic field from the magnetic recording medium 200 reaches the MR device 10. At this time, a sense current flows through the MR film 20 via the bottom electrode 11 and the top electrode 14 in a laminate directon (Z direction) in advance. In other words, a sense current flows through the base layer 21, the antiferromagnetic layer 22, the magnetization fixed layer 23, the intermediate layer 24, the magnetization free layer 25 and the cap layer 26 in this order or in reverse order in the MR film 20. In the MR film 20, a relative magnetization direction changes between the magnetization free layer 25 of which the magnetization direction changes depending upon a signal magnetic field and the magnetization fixed layer 23 of which the magnetization direction is fixed in a substantially predetermined direction by the antiferromagnetic layer 22 and is not affected by an influence of the signal magnetic field. As a result, a change in spin-dependent scattering of conduction electrons occurs, thereby a change in the electrical resistance of the MR film 20 occurs. The change in the electrical resistance causes a change in output voltage, thereby information recorded on the magnetic recording medium 200 is read out through detecting a change in current. Moreover, when the pair of insulating films 15 are disposed, a sense current flowing between the bottom electrode 11 and the top electrode 14 is not easily leaked to the pair of magnetic domain control films 12. In other words, the sense current does not expand in an X direction, and is securely limited to the width of the MR film 20 to pass through the MR film 20, so a change in the resistance of the sense current by a change in the magnetization direction of the magnetization free layer 25 can be detected with higher sensitivity. In FIG. 5, the pair of insulating films 15 are laid over the pair of end surfaces S20 of the MR film 20, and extend in a X direction so as to be laid over the top surface S11 of the bottom electrode 11; however, the pair of insulating films 15 may be laid over at least the pair of end surfaces S20, thereby the above effects can be obtained.

Next, the functions of the MR device 10 according to the embodiment will be described below.

As described above, in the conventional synthetic type CPP-GMR device, the amount of resistance change between the first magnetization fixed film and the magnetization free layer is not sufficiently used, so a solution to this problem is desired. Referring to FIGS. 7 through 9, the factor of the problem and the solution will be described below.

As described above, in the CPP-GMR device, a sense current flows in a direction perpendicular to a laminate surface. Therefore, a voltage change $\Delta V$ in the case where a sense current I flows through the MR device having an area A shown in FIG. 7 and a thickness t in a direction (−Z direction)

perpendicular to the laminate surface depends upon the product of a resistivity change Δρ and the thickness t, that is, the volume of an object. Therefore, the voltage change ΔV is represented by the following formula.

$$\Delta V = \Delta \rho \cdot t \cdot J \tag{1}$$

Herein, "J" represents a current density. The formula (1) can be represented by a formula (2) with the area A of the MR device and an amount of resistance change ΔR per unit area.

$$\Delta V = A \cdot \Delta R \cdot J \tag{2}$$

It is obvious from the formula (2) that the voltage change ΔV is determined by the amount of resistance change AΔR of the whole MR device.

In general, an electrical conductivity σ (volume) in the case where electrons conducted in a thin film keep spinning and are conducted in the volume of the thin film can be represented by the following formula with a bulk scattering coefficient β which is an amount showing the spin-dependent scattering strength of electrons conducted in a volume and the resistivity ρ of the thin film. More specifically, an up-spin electrical conductivity σ↑(volume) and a down-spin electrical conductivity σ↓(volume) are represented by the following formulas.

$$\sigma\uparrow(\text{volume}) = (1+\beta)/2\rho \tag{3}$$

$$\sigma\downarrow(\text{volume}) = (1-\beta)/2\rho \tag{4}$$

The bulk scattering coefficient β shows asymmetry between the up-spin electrical conductivity σ↑(volume) and the down-spin electrical conductivity σ↓(volume), so it can be represented by the following formula.

$$\beta = (\sigma\uparrow - \sigma\downarrow)/(\sigma\uparrow + \sigma\downarrow) \tag{5}$$

Now, a resistivity change Δρ by a bulk scattering effect in a typical spin-valve structure will be considered through the use of the above-described bulk scattering coefficient β referring to a model shown in FIGS. 8A and 8B. FIGS. 8A and 8B conceptually show a relationship between the magnetization directions of a magnetization free layer FL and a magnetization fixed layer PL which face each other with an intermediate layer ML in between. More specifically, FIG. 8A corresponds to a low resistance state in which the magnetization directions of the magnetization free layer LF and the magnetization fixed layer PL are parallel to each other, and FIG. 8B corresponds to a high resistance state in which the magnetization directions are antiparallel to each other. For the sake of simplifying, the electrical resistance of the intermediate layer ML is not considered. At first, in the low resistance state in FIG. 8A, the resistivity ρ(parallel) in the case where up-spin electrons S↑ and down-spin electrons S↓ pass through the magnetization free layer FL and the magnetization fixed layer PL will be considered. The resistivity ρ↑(parallel) of the up-spin electrons S↑ is represented by the following formula.

$$\rho\uparrow(\text{parallel}) = \{2\rho/(1+\beta)\} + \{2\rho/(1+\beta)\} \tag{6}$$
$$= 4\rho/(1+\beta)$$

The resistivity ρ↓(parallel) of the down-spin electrons S↓ is represented by the following formula.

$$\rho\downarrow(\text{parallel}) = \{2\rho/(1-\beta)\} + \{2\rho/(1-\beta)\} \tag{7}$$
$$= 4\rho/(1-\beta)$$

The resistivity ρ(parallel) in consideration of the up-spin electrons S↑ and the down-spin electrons S↓ in the low resistance state is represented by the following formula.

$$\rho(\text{parallel}) = (\rho\uparrow(\text{parallel}) \cdot \rho\downarrow(\text{parallel}))/(\rho\uparrow(\text{parallel}) + \rho\downarrow(\text{parallel}))$$

Therefore, the following formula is derived from the formulas (6) and (7).

$$\rho(\text{parallel}) = 2\rho \tag{8}$$

In a like manner, in the high resistance state in FIG. 8B, the resistivity ρ(antiparallel) in the case where the up-spin electrons S↑ and the down-spin electrons S↓ pass through the magnetization free layer FL and the magnetization fixed layer PL will be considered. The resistivity ρ↑(antiparallel) of the up-spin electrons S↑ is represented by the following formula.

$$\rho\uparrow(\text{antiparallel}) = \{2\rho/(1+\beta)\} + \{2\rho/(1-\beta)\} \tag{9}$$
$$= 4\rho/(1-\beta^2)$$

On the other hand, the resistivity ρ↓(antiparallel) of the down-spin electrons S↓ is represented by the following formula.

$$\rho\downarrow(\text{antiparallel}) = \{2\rho/(1-\beta)\} + \{2\rho/(1+\beta)\} \tag{10}$$
$$= 4\rho/(1-\beta^2)$$

The resistivity ρ↓(antiparallel) in consideration of the up-spin electrons S↑ and the down-spin electrons S↓ in the high resistance state can be represented by the following formula.

$$\rho(\text{antiparallel}) = (\rho\uparrow(\text{antiparallel}) \cdot \rho\downarrow(\text{antiparallel}))/(\rho\uparrow(\text{antiparallel}) + \rho\downarrow(\text{antiparallel}))$$

Therefore, the following formula is derived from the formulas (9) and (10).

$$\rho(\text{antiparallel}) = 2\rho/(1-\beta^2) \tag{11}$$

Therefore, the resistivity change Δρ(volume) by a bulk scattering effect in the spin-valve structure is derived from the formulas (8) and (11) as below.

$$\Delta\rho(\text{volume}) = \rho(\text{antiparallel}) - \rho(\text{parallel}) \tag{12}$$
$$= \{2\rho/(1-\beta^2)\} - 2\rho$$
$$= 2\rho\beta^2/(1-\beta^2)$$

Therefore, it is considered that the larger the bulk scattering coefficient β is, the larger the resistivity change Δρ becomes.

Moreover, in the multilayer structure, a resistance due to an interface scattering effect in an interface between each layer exists. In the CPP-GMR device, the sense current I flows in a direction perpendicular to the interface, so it is necessary to consider the effect.

In general, an electrical conductivity ρ(interface) in an interface can be represented with an interface scattering coefficient γ. More specifically, an up-spin electrical conductivity σ↑(interface) and a down-spin electrical conductivity σ↓(interface) are represented by the following formulas. Herein, Rk represents an interface resistance per unit area where the sense current I passes.

$$\sigma\uparrow(\text{interface})=(1+\gamma)/2Rk\cdot A \quad (13)$$

$$\rho\downarrow(\text{interface})=(1-\gamma)/2Rk\cdot A \quad (14)$$

The interface scattering coefficient γ shows asymmetry between the up-spin electrical conductivity σ↑(interface) and the down-spin electrical conductivity σ↓(interface), and it can be represented by the following formula.

$$\gamma=(\sigma\uparrow-\sigma\downarrow)/(\sigma\uparrow+\sigma\downarrow) \quad (15)$$

As in the case of the bulk scattering effect, an interface resistance change ΔRk·A(parallel) by an interface scattering effect in a typical spin-valve structure will be considered through the use of the above-described interface scattering coefficient γ referring to the model shown in FIGS. 8A and 8B. At first, in the low resistance state shown in FIG. 8A, the interface resistance Rk·A↑(parallel) in the case where the up-spin electrons S↑ and the down-spin electrons S↓ pass through the magnetization free layer FL and the magnetization fixed layer PL will be considered. The interface resistance Rk·A↓(parallel) of the up-spin electrons is represented by the following formula.

$$Rk\cdot A\uparrow(\text{parallel}) = \{2Rk\cdot A/(1+\gamma)\} + \{2Rk\cdot A/(1+\gamma)\} \quad (16)$$
$$= 4Rk\cdot A/(1+\gamma)$$

On the other hand, the interface resistance Rk·A↓(parallel) of the down-spin electrons S↓ is represented by the following formula.

$$Rk\cdot A\downarrow(\text{parallel}) = \{2Rk\cdot A/(1-\gamma)\} + \{2Rk\cdot A/(1-\gamma)\} \quad (17)$$
$$= 4Rk\cdot A/(1-\gamma)$$

The interface resistance Rk·A(parallel) in consideration of the up-spin electrons S↑ and the down-spin electrons S↓ is represented by the following formula.

$$Rk\cdot A(\text{parallel})=(Rk\cdot A\uparrow(\text{parallel})\cdot Rk\cdot A\downarrow(\text{parallel}))/(Rk\cdot A\uparrow(\text{parallel})+Rk\cdot A\downarrow(\text{parallel}))$$

Therefore, the following formula is derived from the formulas (16) and (17).

$$Rk\cdot A(\text{parallel})=2Rk\cdot A \quad (18)$$

In a like manner, in the high resistance state shown in FIG. 8B, the interface resistance Rk·A(antiparallel) in the case where the up-spin electrons S↑ and the down-spin electrons S↓ pass through the magnetization free layer FL and the magnetization fixed layer PL will be considered. The interface resistance Rk·A↑(antiparallel) of the up-spin electrons S↑ is represented by the following formula.

$$Rk\cdot A\uparrow(\text{antiparallel}) = \{2Rk\cdot A/(1+\gamma)\} + \{2Rk\cdot A/(1-\gamma)\} \quad (19)$$
$$= 4Rk\cdot A/(1-\gamma^2)$$

On the other hand, the interface resistance Rk·A↓(antiparallel) of the down-spin electrons S↓ is represented by the following formula.

$$Rk\cdot A\downarrow(\text{antiparallel}) = \{2Rk\cdot A/(1-\gamma)\} + \{2Rk\cdot A/(1+\gamma)\} \quad (20)$$
$$= 4Rk\cdot A/(1-\gamma^2)$$

The interface resistance Rk·A(antiparallel) in consideration of the up-spin electrons S↑ and the down-spin electrons S↓ in the high resistance state can be represented by the following formula.

$$Rk\cdot A(\text{antiparallel})=(Rk\cdot A\uparrow(\text{antiparallel})\cdot Rk\cdot A\downarrow(\text{antiparallel}))/(Rk\cdot A\uparrow(\text{antiparallel})+Rk\cdot A\downarrow(\text{antiparallel}))$$

Therefore, the following formula is derived from the formulas (19) and (20).

$$Rk\cdot A(\text{antiparallel})=2Rk\cdot A/(1-\gamma^2) \quad (21)$$

Therefore, the interface resistance change ΔRk·A in the spin-valve structure is derived from the formulas (18) and (21).

$$\Delta Rk\cdot A = Rk\cdot A(\text{antiparallel}) - Rk\cdot A(\text{parallel}) \quad (22)$$
$$= \{2Rk\cdot A/(1-\gamma^2)\} - 2Rk\cdot A$$
$$= 2Rk\cdot A\cdot\gamma^2/(1-\gamma^2)$$

Therefore, it is considered that the larger the interface scattering coefficient γ is, the larger the interface resistance change ΔRk·A becomes.

Figure 9A:
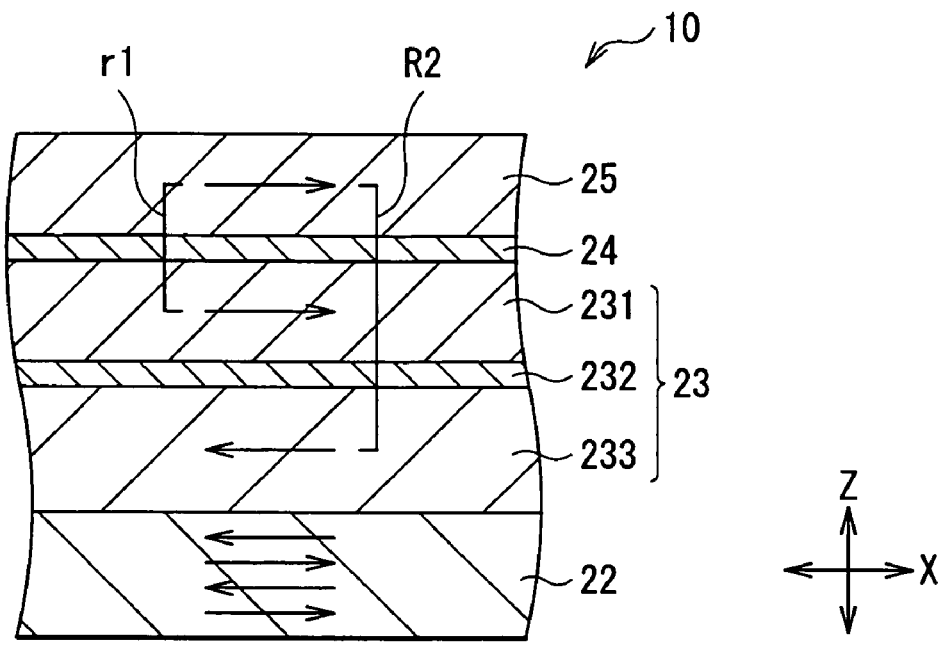
FIGS. 9A and 9B are illustrations for describing a relationship between resistance and a magnetization direction in the case where a sense current flows through the MR device shown in FIG. 5 in a direction perpendicular to the laminate surface.
Figure 9B:
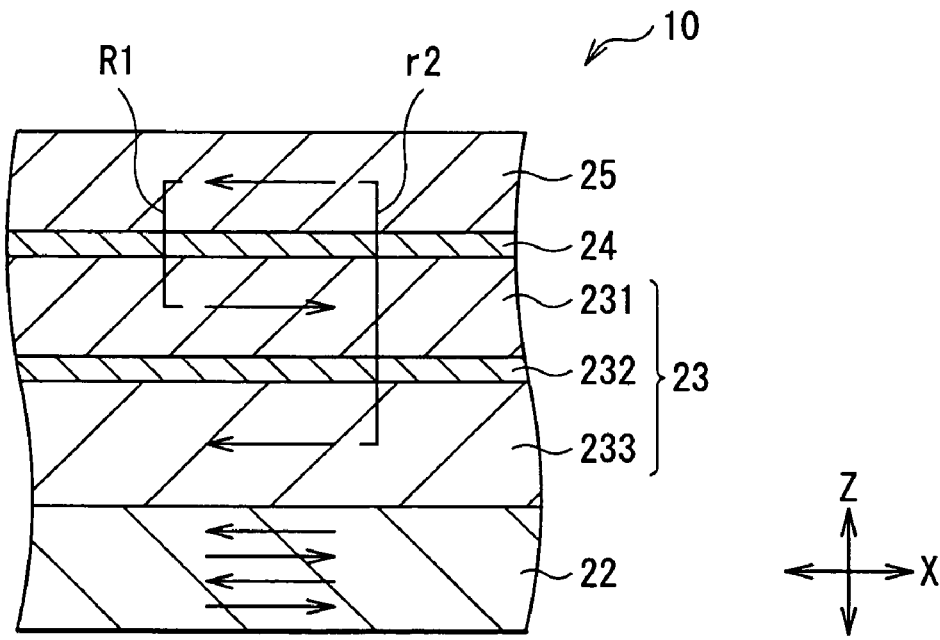
Figure 10:
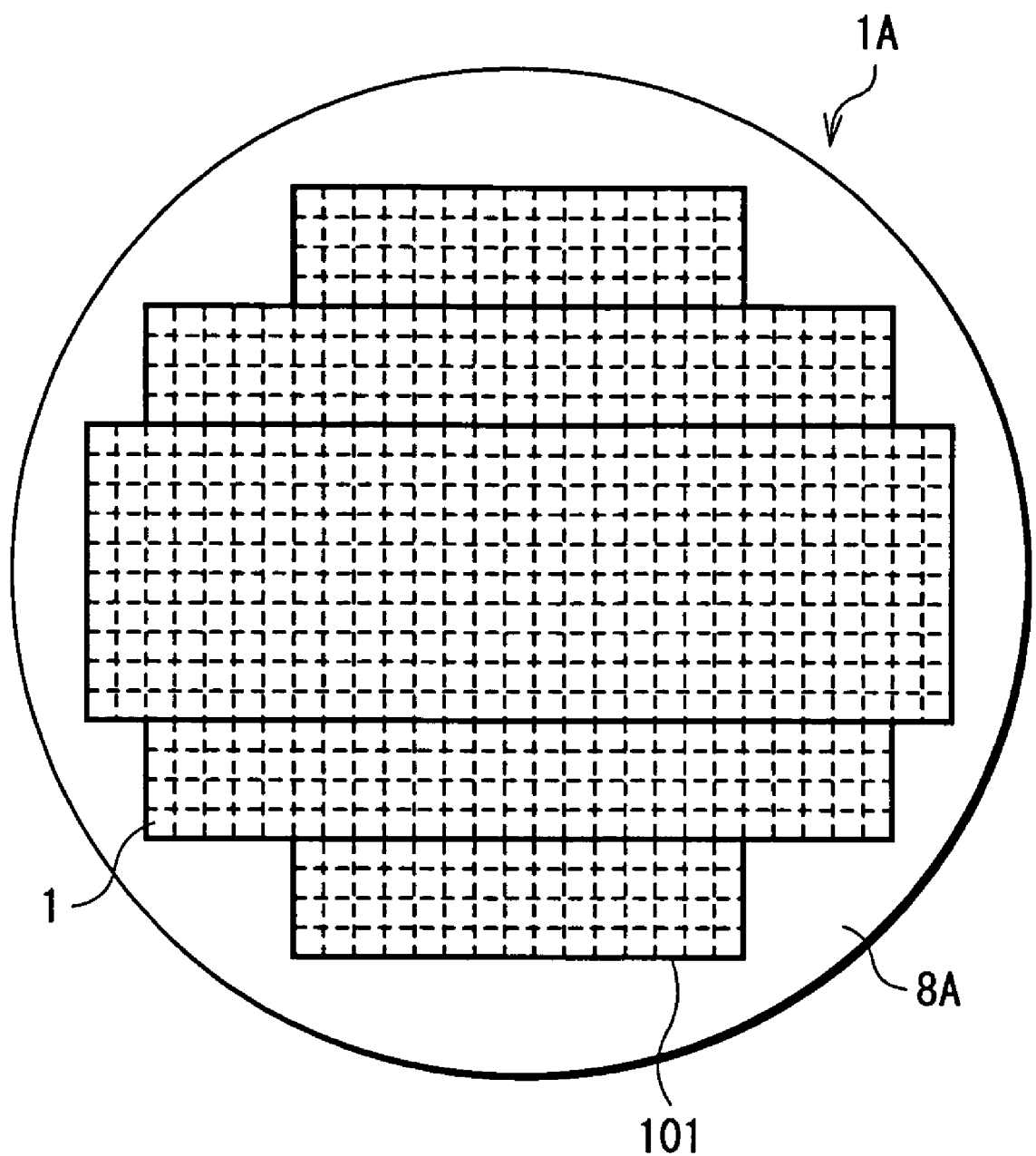
FIG. 10 is a plan view of a wafer used for manufacturing the thin film magnetic head shown in FIG. 5.

Now, the case where the whole MR device 10 is in a relatively low resistance state as shown in FIG. 9A and the case where the whole MR device 10 is in a relatively high resistance state as shown in FIG. 9B will be considered. Each arrow in FIGS. 9A and 9B indicates a relative magnetization direction of each layer. In the antiferromagnetic layer 22, antiparallel magnetizations cancel each other out, so macroscopically no magnetization direction exists. More specifically, in FIG. 9A, the magnetization direction of the magnetization free layer 25 is oriented in a +X direction which is parallel to the magnetization direction of the first magnetization fixed film 231 and antiparallel to the magnetization direction of the second magnetization fixed film 233. On the other hand, in FIG. 9B, the magnetization direction of the magnetization free layer 25 is oriented in a −X direction, which is antiparallel to the magnetization direction of the first magnetization fixed film 231 and parallel to the magnetization direction of the second magnetization fixed film 233. It is considered that the amount of resistance change AΔR of the MR device 10 appears as a difference between the low resistance state shown in FIG. 9A and the high resistance state shown in FIG. 9B.

The amount of resistance change AΔR in a relationship between the magnetization free layer 25 and the first magnetization fixed film 231 and in a relationship between the magnetization free layer 25 and the second magnetization fixed film 233 will be considered. At first, the magnetization directions of the magnetization free layer 25 and the first magnetization fixed film 231 are parallel to each other in FIG. 9A, so a relatively low resistance r1 is shown, and in FIG. 9B, they are antiparallel to each other, so a relatively high resistance R1 is shown (that is, r1<R1). On the other hand, the magnetization directions of the magnetization free layer 25 and the second magnetization fixed film 233 are antiparallel to each other in FIG. 9A, so a relatively high resistance R2 is shown, and in FIG. 9B, they are parallel to each other, so a relatively low resistance r2 is shown (that is, R2>r2). Therefore, for example, the amount of resistance change $A\Delta R$ in the case of shifting from the low resistance state shown in FIG. 9A to the high resistance state shown in FIG. 9B is proportional to the sum of an amount of resistance change by a GMR effect of the magnetization free layer 25 and the first magnetization fixed film 231 and an amount of resistance change by a GMR effect of the magnetization free layer 25 and the second magnetization fixed layer 233, so the amount of resistance change $A\Delta R$ can be represented by the following formula.

$$A\Delta R \propto A(R1-r1) + A(r2-R2) \quad (23)$$

Herein, the first term "$A(R1-r1)$" represents the amount of resistance change by the GMR effect of the magnetization free layer 25 and the first magnetization fixed film 231, and the second term "$A(r2-R2)$" represents the amount of resistance change by the GMR effect of the magnetization free layer 25 and the second magnetization fixed film 233. The first term "$A(R1-r1)$" shows a positive value, because $R1>r1$. On the other hand, the second term "$A(r2-R2)$" shows a negative value, because $R2>r2$. It is because a relationship between the magnetization directions of the magnetization free layer 25 and the second magnetization fixed film 233 is always in a state opposite to the state in a relationship between the magnetization directions of the magnetization free layer 25 and the first magnetization fixed film 231. The amount of resistance change $A\Delta R$ is represented by the following Mathematical Formula 1 with the resistivity p, the interface resistance Rk, the bulk scattering coefficient $\beta$ the interface scattering coefficient $\gamma$ and the like on the basis of the formula (23).

[Mathematical Formula 1]

$$A\Delta R = \frac{\Delta(\beta_{AP1} \cdot \rho^*_{AP1} \cdot t_{AP1} + \gamma_{AP1/S} \cdot ARk^*_{AP1/S} - \beta_{AP2} \cdot \rho^*_{AP2} \cdot t_{AP2})}{ARk^*_{Buf/AP2} + \rho^*_{AP2} \cdot t_{AP2} + \rho^*_R \cdot t_R + ARk^*_{R/AP1} + \rho^*_{AP1} \cdot t_{AP1} +} \\ \frac{(\gamma_{S/F} \cdot ARk^*_{S/F} + \beta_F \cdot \rho^*_F \cdot t_F)}{ARk^*_{AP1/S} + \rho^*_S \cdot t_S + ARk^*_{S/F} + \rho^*_F \cdot t_F + ARk^*_{F/Cap}}$$

In Mathematical Formula 1, $\rho^*$ represents $\rho/(1-\beta^2)$, and Rk* represents $Rk/(1-\gamma^2)$. The thicknesses of the first magnetization fixed film 231, the second magnetization fixed film 233, the magnetization free layer 25, the intermediate layer 24 and the non-magnetic film 232 represent $t_{AP1}$, $t_{AP2}$, $t_F$, $t_S$, and $t_R$, respectively. In Mathematical Formula 1, in a like manner, the resistivities $\rho$ of the first magnetization fixed film 231, the second magnetization fixed film 233, the magnetization free layer 25, the intermediate layer 24 and the non-magnetic film 232 represent $\rho_{AP1}$, $\rho_{AP2}$, $\rho_F$, $\rho_S$, and $\rho_R$, respectively, and correspond to $\rho^*_{AP1}$, $\rho^*_{AP2}$, $\rho^*_F$, $\rho^*_S$, and $\rho^*_R$ in Mathematical Formula 1, respectively. The bulk scattering coefficients of the first magnetization fixed film 231, the second magnetization fixed film 233 and the magnetization free layer 25 represent $\beta_{AP1}$, $\beta_{AP2}$ and $\beta_F$, respectively. The interface resistance between the base layer 21, the antiferromagnetic layer 22 and the second magnetization fixed film 233, the interface resistance between the non-magnetic film 232 and the first magnetization fixed film 231, the interface resistance between the first magnetization fixed film 231 and the intermediate layer 24, the interface resistance between the intermediate layer 24 and the magnetization free layer 25, and the interface resistance between the magnetization free layer 25 and the cap layer 26 represent $ARk_{Buf/AP2}$, $ARk_{R/AP1}$, $ARk_{AP1/S}$, $ARk_{S/F}$ and $ARk_{F/Cap}$, respectively, which correspond to $ARk^*_{Buf/AP2}$, $ARk^*_{R/AP1}$, $ARk^*_{AP1/S}$, $ARk^*_{S/F}$, and $ARk^*_{F/Cap}$ in Mathematical Formula 1, respectively. Further, $\gamma_{AP1/S}$ is the interface scattering coefficient between the first magnetization fixed film 231 and the intermediate layer 24, and $\gamma_{S/F}$ is the interface scattering coefficient between the intermediate layer 24 and the magnetization free layer 25.

In Mathematical Formula 1, the influence of the second term "$A(r2-R2)$" in the formula (23) is shown in a coefficient "$-1$" in the term "$-\beta_{AP2} \rho^*_{AP2} t_{AP2}$". In general, the bulk scattering coefficient $\beta$ and the interface scattering coefficient $\gamma$ of a material used in the MR device is positive ($\beta$, $\gamma > 0$) (for example, the bulk scattering coefficient $\beta$ of a CoFe alloy used in a conventional magnetization fixed film is approximately 0.65). Therefore, the term with a negative sign "$-\beta_{AP2} \rho^*_{AP2} t_{AP2}$" is a component which works to reduce the amount of resistance change $A\Delta R$, so it is desired to minimize the absolute value. Because of this reason, in the embodiment, a ferromagnetic material with a smaller bulk scattering coefficient $\beta$ than that of a conventional one (specifically 0.25 or less, and more specifically 0.20 or less) is used in the second magnetization fixed film 233. As a result, a loss in the amount of resistance change $A\Delta R$ which is produced in a conventional synthetic type CPP-GMR device can be reduced, so a magnetoresistive ratio $\Delta R/R$ increases, and a signal magnetic field can be detected with higher sensitivity.

As described above, the MR device 10 according to the embodiment comprises the MR film 20 including the magnetization fixed layer 23, which includes the first magnetization fixed film 231 having a magnetization direction fixed in a predetermined direction and the second magnetization fixed film 233 having a magnetization direction fixed in a direction opposite to the magnetization direction of the first magnetization fixed film 231, and a bulk scattering coefficient $\beta$ of 0.25 or less through including at least one selected from the group consisting of tantalum (Ta), chromium (Cr) and vanadium (V), and the magnetization free layer 25, which is disposed on a side of the first magnetization fixed film 231 opposite to a side where the second magnetization fixed film 233 is disposed and has a magnetization direction changing depending upon an external magnetic field, and in the MR device 10 according to the embodiment, the sense current I flows through the MR film 20 via the bottom electrode 11 and the top electrode 14 in a direction perpendicular to a laminate surface. Thereby, a bulk scattering effect by the second magnetization fixed film 233 which has a function of canceling out the amount of resistance change (R1−r1) between the magnetization free layer 25 and the first magnetization fixed film 231 is prevented. Therefore, a reduction in the amount of resistance change can be prevented, and the magnetoresistive ratio $\Delta R/R$ can be improved, and the MR device 10 can respond to reading of magnetic information recorded with a higher recording density. In particular, as the first magnetization fixed film 231 and the second magnetization fixed film 233 are exchange coupled to each other through the non-magnetic film 232, and the antiferromagnetic layer 22 which fixes the magnetization direction of the second magnetization fixed film 233 is further disposed on a side of the second magnetization fixed film 233 opposite to a side where the first magnetization fixed film 231 is disposed, the stability of the magnetization direction in the magnetization fixed layer 23 can be improved, and a stabler amount of resistance change AΔR can be obtained, thereby the MR device 10 can respond to a higher recording density.

Next, referring to FIGS. 10 through 15, a method of manufacturing the thin film magnetic head 1 will be described below. Herein, mainly a portion where the MR device 10 is formed will be described in detail.

A method of manufacturing the thin film magnetic head according to an embodiment comprises the steps of forming the bottom electrode 11 on the substrate 8A which will be the base substrate 8 in a later step; forming a multilayer film 20Z including a structure in which the antiferromagnetic layer 22, the magnetization fixed layer 23, the intermediate layer 24 and the magnetization free layer 25 are laminated in order on the bottom electrode 11; selectively forming a photoresist pattern 61 on the multilayer film 20Z so as to protect a region corresponding to a portion determining a device width; forming the MR device 10 through selectively etching the multilayer film 20Z through the use of the photoresist pattern 61 as a mask; forming a pair of magnetic domain control films 12 with the insulating film 15 in between through removing the photoresist pattern 61, after selectively forming the insulating film and a ferromagnetic film; forming the insulating film 13 on the pair of magnetic domain control films 12; and forming the top electrode 14 on the whole surface after removing the photoresist pattern 61. Herein, a wafer 1A is formed through disposing an aggregate 101 of thin film magnetic heads 1 in which a plurality of thin film magnetic heads 1 are aligned on the substrate 8A in one operation so as to form a plan structure shown in FIG. 10. Each step will be described in more detail below.

Figure 11:
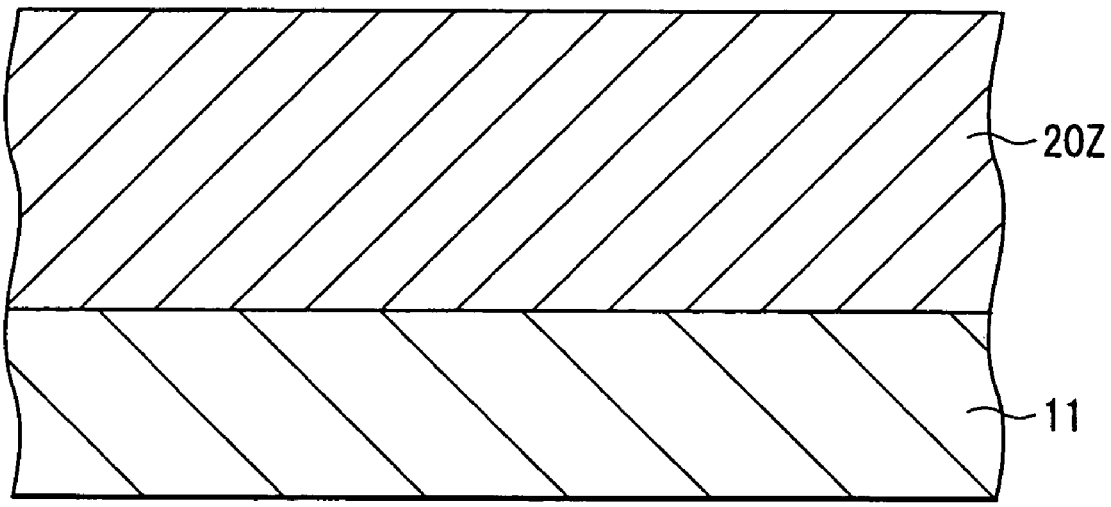
FIG. 11 is a partial sectional view showing a step in a method of manufacturing the thin film magnetic head shown in FIG. 5.

At first, as shown in FIG. 11, the multilayer film 20Z is formed on the whole surface so as to be laid over the bottom electrode 11 formed on the substrate 8A. More specifically, the base layer 21, the antiferromagnetic layer 22, the magnetization fixed layer 23, the intermediate layer 24, the magnetization free layer 25 and the cap layer 26 are laminated in order through sputtering or the like. The multilayer film 20Z becomes the MR film 20 in a later step. In FIGS. 11 through 15, the internal structures of the MR film 20 and the multilayer film 20Z during forming the MR film 20 are not shown; however, they have an internal structure corresponding to MR film 20 shown in FIG. 5.

Figure 12:
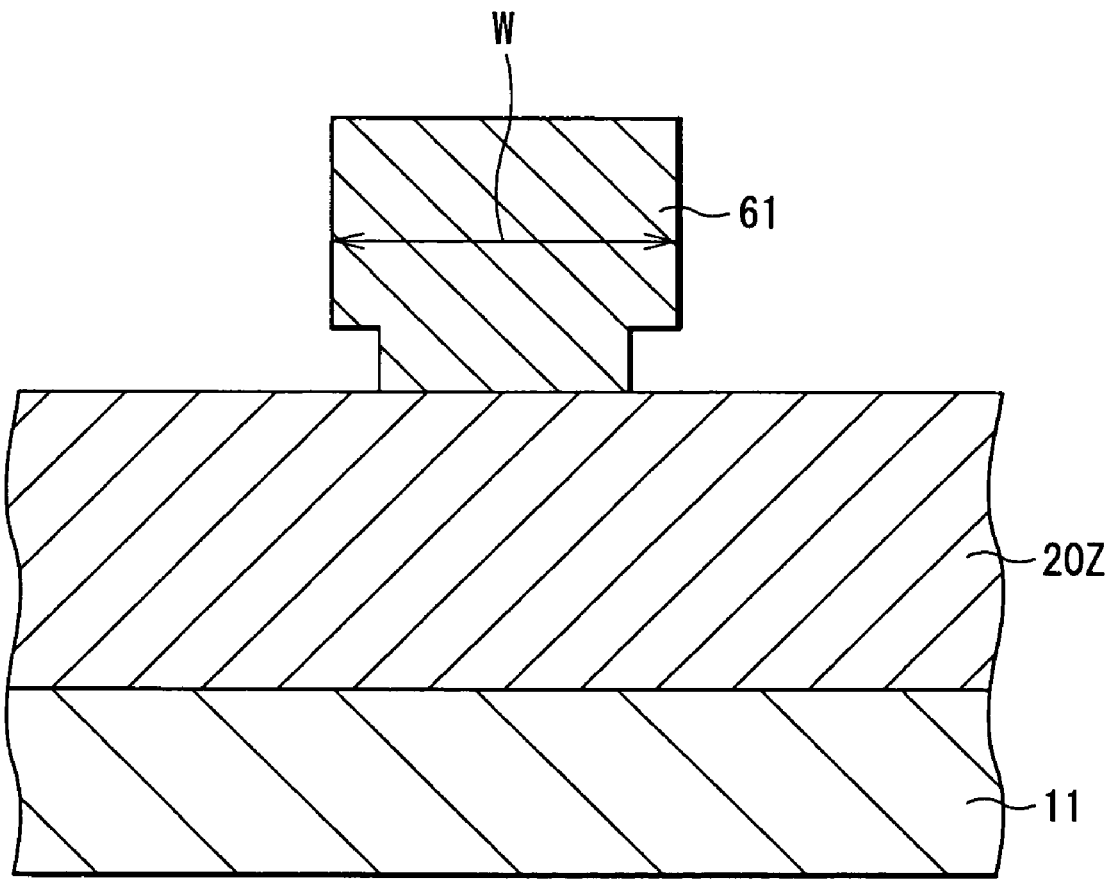
FIG. 12 is a partial sectional view showing a step following the step of FIG. 11.

Next, as shown in FIG. 12, the photoresist pattern 61 is selectively formed on the multilayer film 20Z so as to have a width W corresponding to a portion determining the device width. In this case, an end portion of the photoresist pattern 61 may be partially removed through the use of a predetermined solvent to form an undercut.

Figure 13:
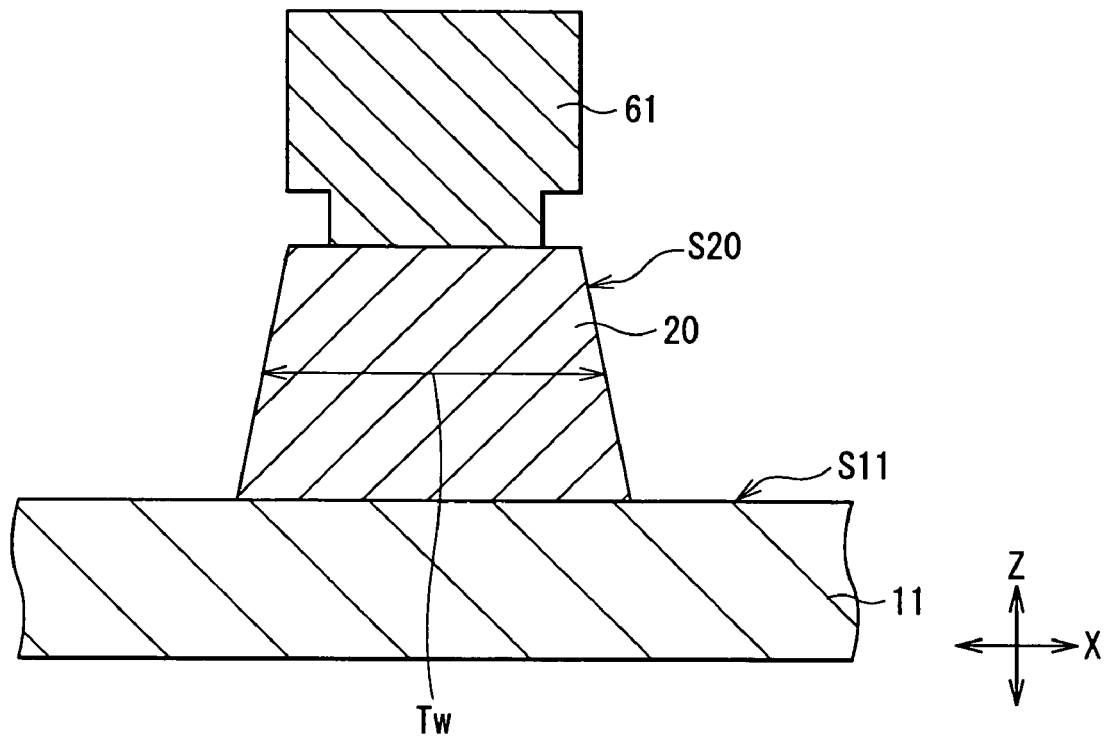
FIG. 13 is a partial sectional view showing a step following the step of FIG. 12.
Figure 14:
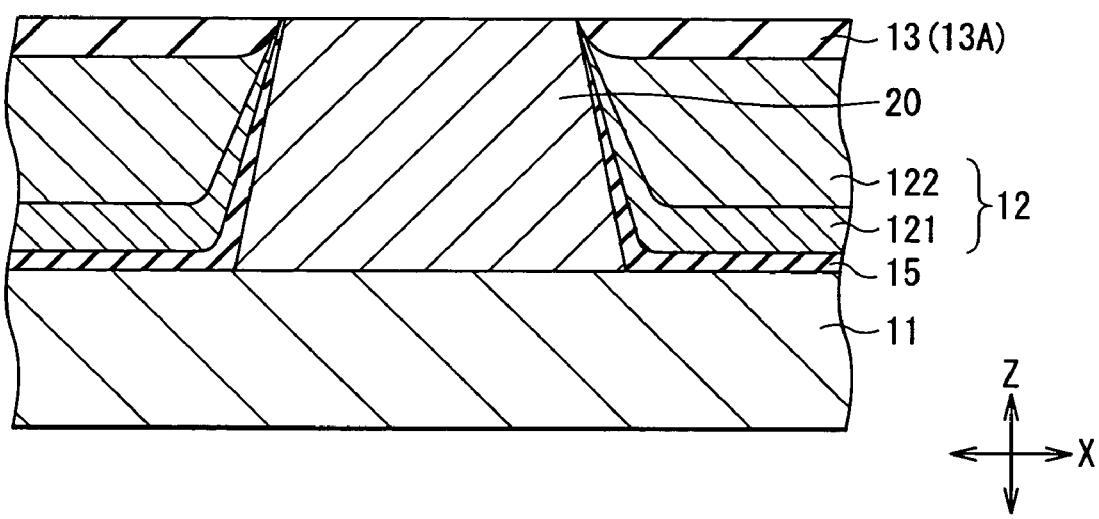
FIG. 14 is a partial sectional view showing a step following the step of FIG. 13.

After that, the multilayer film 20Z is selectively removed by, for example, dry etching such as ion milling or RIE through the use of the photoresist pattern 61 as a mask. In this case, dry etching is carried out until reaching the bottom electrode 11. Thereby, as shown in FIG. 13, the MR film 20 with a thickness Tw is formed. The width Tw is an average device width of the MR film 20. After forming the MR film 20, as shown in FIG. 14, a pair of insulating films 15 and a pair of magnetic domain control films 12 are formed adjacent to both sides of the MR device 20 in an X direction. More specifically, the insulating films 15, the base layers 121 and the magnetic domain control layers 122 are formed in order on the whole surface by, for example, sputtering or the like.

Moreover, the insulating film 13 is formed on the magnetic domain control films 12 by, for example, sputtering. Next, the photoresist pattern 61 is lifted off so that the MR film 20, the pair of insulating films 15 facing each other with the MR film 20 in between, and the pair of magnetic domain control films 12 including the base layers 121 and the magnetic domain control layers 122 appear.

Figure 15:
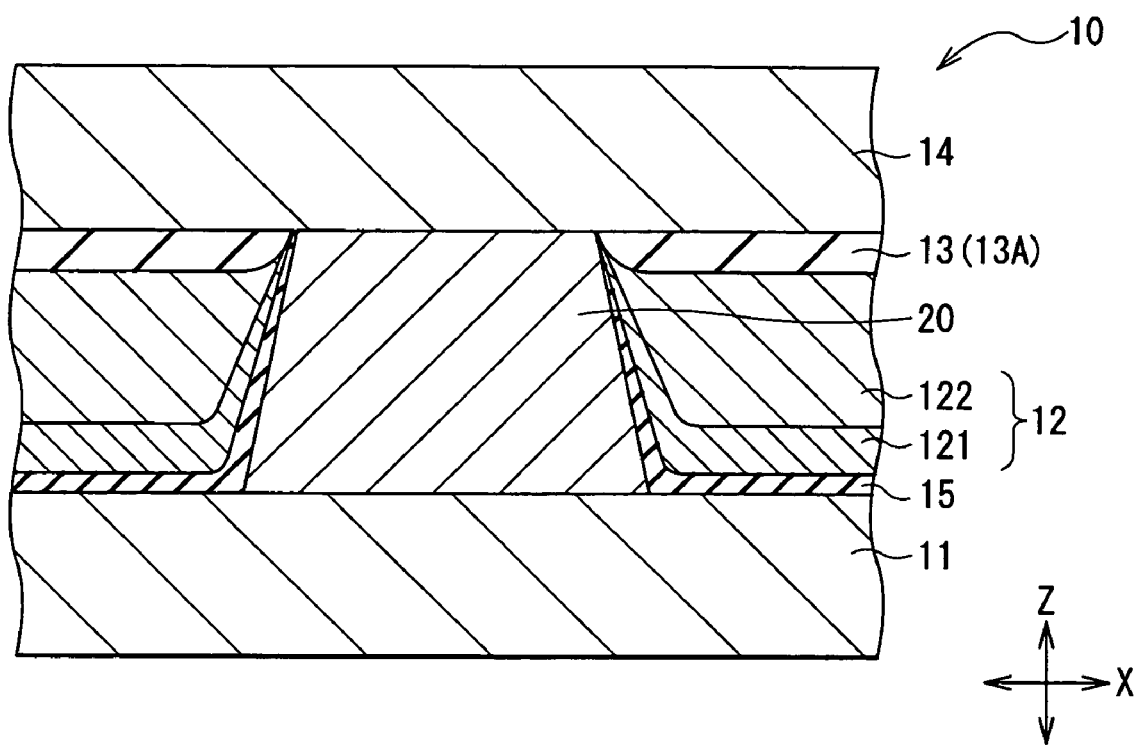
FIG. 15 is a partial sectional view showing a step following the step of FIG. 14.

After removing the photoresist pattern 61, as shown in FIG. 15, the top electrode 14 is formed on the whole surface. Thereby, the MR device 10 is tentatively completed. After that, the insulating layer 16 is formed on the whole surface to tentatively complete the reproducing head portion 1A (refer to FIGS. 3 and 4). Next, the bottom magnetic pole 41 and the write gap layer 42 are formed in order on the reproducing head portion 1A, and the coil 44 is selectively formed on the write gap layer 42. After that, the opening 42A is formed through etching a part of the write gap layer 42. Next, the insulating layer 45 is formed so as to be laid over the coil 44, and the pole tip 43 and the connecting portion 46 are formed in order. Finally, the top magnetic pole 47 is formed so as to be laid over the whole surface to tentatively complete the recording head portion 1B, thereby the formation of the wafer 1A is completed. The aggregate 101 in the wafer 1A is cut into arrays to form bars, and an end of each bar is mechanically processed to form the recording-medium-facing surface 9, and the thin film magnetic head 1 is completed through predetermined steps such as cutting the bar into each thin film magnetic head 1.

EXAMPLES

Next, specific examples of the invention will be described below.

A first example and a second example (Examples 1 and 2) of the invention to be described below were samples of the thin film magnetic head 1 comprising the MR device 10 with a sectional structure shown in FIG. 5 and being formed by the manufacturing method described in the above embodiment, and characteristics of the samples were examined. The examination of the characteristics of the samples will be described in detail below referring to Tables 1 through 5 and FIG. 16. Samples of Examples 1 and 2 had the common structure described below. The area A of the MR device 10 (the MR film 20) was 0.01 μm² (0.1 μm×0.1 μm) in all samples.

<Common Structure>

Ta1/NiFeCr5/IrMn7/"*AP2*"/Ru0.8/[CoFe 1/Cu0.2]2/ CoFe1/Cu3.2/CoFe1.5/Cu0.3/CoFe1.5/Cap

In the above common structure, the numerical value attached to each material indicates the thickness of each layer (its unit is nanometer; nm). Moreover, [CoFe1/Cu0.2]2 indicates a structure in which two CoFe layers with a thickness of 1 nm and two copper layers with a thickness of 0.2 nm are alternately laminated. In the above common structure, a laminate structure (Ta1/NiFeCr5) including a Ta layer with a thickness of 1 nm and a NiFeCr layer with a thickness of 5 nm corresponds to the base layer 21, and an IrMn layer with a thickness of 7 nm (IrMn7) corresponds to the antiferromagnetic layer 22. Moreover, the second magnetization fixed film 233 ("AP2"), the non-magnetic film 232 made of ruthenium with a thickness of 0.8 nm (Ru0.8), and the first magnetization fixed film 231 including [CoFe1/Cu0.2]2 with the above-described structure and CoFe with a thickness of 1 nm constitute the magnetization fixed layer 23. Further, a copper layer with a thickness of 3.2 nm (Cu3.2) corresponds to the intermediate layer 24, and two ferromagnetic films 251 and 253 made of CoFe with a thickness of 1.5 nm (CoFe1.5) and the non-magnetic film 252 made of copper with a thickness of 0.3 nm (Cu0.3) constitute the magnetization free layer 25.

The samples of Examples 1 and 2 had different structures of the second magnetization fixed film 233 indicated by "AP2" in the above common structure. The second magnetization fixed film 233 with a different structure was formed through the use of an alloy material in which an added material X including one selected from the group consisting of tantalum, chromium and vanadium was added to CoFe. The alloy material is shown as CoFeX (X=Ta, Cr, V). The total thickness of CoFeX was 3 nm. In the above common structure, the composition ratio in CoFe was Co:Fe=9:1 in all samples. The resistance RA ($\Omega \cdot \mu m^2$) of the whole device, the amount of resistance change A$\Delta$R(m$\Omega \cdot \mu m^2$), the magnetoresistive ratio MR RATIO (%), and the bulk scattering coefficient $\beta$ of the second magnetization fixed film 233 in each sample were determined. The resistance RA and the amount of resistance change A$\Delta$R were measured by typical four-terminal measurement. A method of calculating the bulk scattering coefficient $\beta$ will be described later.

Example 1

In the example, samples in the case of X=Ta, that is, in the case where the second magnetization fixed film 233 ("AP2") was made of a cobalt iron tantalum alloy (CoFeTa) were examined. Four different tantalum contents: 0.8 at %, 1.0 at %, 5.0 at % and 10.0 at % of the second magnetization fixed film 233 were prepared. The results are shown in Table 1.

TABLE 1

| Ta CONTENT [at %] | RA [$\Omega \mu m^2$] | A$\Delta$R [m$\Omega \mu m^2$] | MR RATIO [%] | $\beta$ |
|---|---|---|---|---|
| 0.8 | 0.102 | 1.73 | 1.70 | 0.30 |
| 1.0 | 0.113 | 2.03 | 1.80 | 0.23 |
| 5.0 | 0.128 | 2.59 | 2.03 | 0.09 |
| 10.0 | 0.142 | 3.05 | 2.15 | 0.08 |

Example 2

In the example, samples in the case of X=Cr or X=V, that is, in the case where the second magnetization fixed film 233 ("AP2") was made of a cobalt iron chromium alloy (CoFeCr) or a cobalt iron vanadium alloy (CoFeV) were examined. Four different chromium contents and four different vanadium contents: 11 at %, 13 at %, 16 at % and 19 at % of the second magnetization fixed film 233 were prepared. The results are shown in Table 2.

TABLE 2

| Cr, V CONTENT [at %] | RA [$\Omega \mu m^2$] | A$\Delta$R [m$\Omega \mu m^2$] | MR RATIO [%] | $\beta$ |
|---|---|---|---|---|
| Cr; 11 | 0.120 | 1.82 | 1.52 | 0.34 |
| V; 11 | 0.130 | 1.89 | 1.45 | 0.30 |
| Cr; 13 | 0.131 | 2.19 | 1.67 | 0.25 |
| V; 13 | 0.141 | 2.33 | 1.65 | 0.21 |
| Cr; 16 | 0.142 | 2.56 | 1.80 | 0.23 |
| V; 16 | 0.157 | 2.72 | 1.73 | 0.18 |
| Cr; 19 | 0.150 | 2.60 | 1.73 | 0.20 |
| V; 19 | 0.163 | 2.79 | 1.71 | 0.16 |

Comparative Example 1

A thin film magnetic head which comprised the magnetization fixed film ("AP2") including only CoFe and not including any other material such as tantalum, chromium or vanadium was formed as Comparative Example 1 relative to the above examples, and the same items as those in the examples were determined. The thin film magnetic head of Comparative Example 1 had the same structure as the common structure of the examples, except for the second magnetization fixed film. The results are shown in Table 3.

TABLE 3

| CoFe CONTENT [at %] | RA [$\Omega \mu m^2$] | A$\Delta$R [m$\Omega \mu m^2$] | MR RATIO [%] | $\beta$ |
|---|---|---|---|---|
| 10.0 | 0.11 | 1.9 | 1.73 | 0.65 |

The bulk scattering coefficient $\beta$ is a specific value determined by a material composition. The values in a column "$\beta$" in Tables 1 through 3 were determined through carrying out the following auxiliary experiment.

In order to determine the bulk scattering coefficient $\beta$ of the second magnetization fixed film 233, for the sake of simplifying, four samples with a (conventional type) spin-valve structure including no synthetic type magnetization fixed layer but a single layer magnetization fixed layer with different composition ratios per composition were formed, and the amount of resistance change A$\Delta$R of the samples were determined, and the bulk scattering coefficient $\beta$ was calculated by their proportional relationship (refer to Example 3). Moreover, in this case, a comparative example (Comparative Example 2) in which the magnetization fixed layer is made of only CoFe was formed.

Example 3

The detailed structure of each sample subjected to the auxiliary experiment is shown below.

Ta1/NiFeCr5/IrMn7/CoFeX5/Cu3/CoFe2/Cap

The number attached to the material of each layer indicate the thickness (nm) of each layer. More specifically, "Ta/NiFeCr", "IrMn", "CoFeX", "Cu", "CoFe" and "Cap" correspond to the base layer 21, the antiferromagnetic layer 22, the magnetization fixed layer 23, the intermediate layer 24, the magnetization free layer 25 and the cap layer 26, respectively. Herein, X is an added material which is one kind selected from the group consisting of Ta, Cr and V. Four contents of each added material in the magnetization fixed film (CoFeX5) were prepared. The measured amounts of resistance change A$\Delta$R are shown in Table 4.

TABLE 4

| Ta CONTENT [at %] | A$\Delta$R [m$\Omega \mu m^2$] | Cr CONTENT [at %] | A$\Delta$R [m$\Omega \mu m^2$] | V CONTENT [at %] | A$\Delta$R [m$\Omega \mu m^2$] |
|---|---|---|---|---|---|
| 0.8 | 0.9792 | 11 | 1.0158 | 11 | 0.9188 |
| 1.0 | 0.8467 | 13 | 0.8505 | 13 | 0.7711 |
| 5.0 | 0.6146 | 16 | 0.8170 | 16 | 0.7259 |
| 10.0 | 0.5990 | 19 | 0.7686 | 19 | 0.6966 |

Comparative Example 2

A sample as Comparative Example 2 relative to Example 3 had the following structure.

Ta1/NiFeCr5/IrMn7/CoFe5/Cu3/CoFe2/Cap

Herein "CoFe5" is a portion corresponding to the magnetization fixed layer 23.

When the amount of resistance change in the sample of Comparative Example 2 is AΔR(Comparative Example 2), and the amount of resistance in the samples of Example 3 is AΔR(Example 3), the ratio between them can be represented by the following formula (24).

$$A\Delta R(\text{Comparative Example 2}){:}A\Delta R(\text{Example 3}) = \{\beta(\text{CoFe})\rho^*(\text{CoFe})t(\text{CoFe}) + \gamma(\text{CoFe/Cu})ARk^*(\text{CoFe/Cu})\}{:}\{\beta(X)\rho^*(X)t(X) + \beta(\text{CoFe/Cu})ARk^*(\text{CoFe/Cu})\} \quad (24)$$

The following value was already obtained by literature or the like.

AΔR(Comparative Example 2)=0.94 (mΩμm$^2$),
β(CoFe)=0.65,
ρ*(CoFe)t(CoFe)=0.578,
γ(CoFe/Cu)=0.75,
ARk*(CoFe/Cu)=0.52 (mΩμm$^2$)

When these values were substituted into the formula (24), the formula (24) was translated into the following formula (25).

$$\frac{A\Delta R}{(\text{Example 3})} = 0.94 \times \{\beta(X)_\rho * (X)t(X) + 0.75 \times 0.52\} / (0.65 \times 0.578 + 0.75 \times 0.52)$$

$$\approx 1.23 \times \beta(X)_\rho * (X)t(X) + 0.48 \quad (25)$$

The bulk scattering coefficient β in each material composition shown in Tables 1 through 3 could be determined from the formula (25) and the results shown in Table 4.

When Examples 1 and 2 shown in Tables 1 and 2 were compared to Comparative Example 1 shown in Table 3 as a reference, it was found out that in Examples 1 and 2, there was a tendency that as the content of the added material X increased, the amount of resistance change AΔR and the magnetoresistive ratio MR RATIO were improved. More specifically, in Example 1, it was found out that when the tantalum content was 1.0 at % or more, the amount of resistance change AΔR and the magnetoresistive ratio MR RATIO were improved more than those in Comparative Example 1. Likewise, in Example 2, it was found out that when the chromium content and the vanadium content each were 13 at % or more, the amount of resistance change AΔR was improved more than that in Comparative Example 1. In other words, it was confirmed that in Examples 1 and 2, when the bulk scattering coefficient β in the second magnetization fixed film 233 was 0.25 or less (preferably 0.20 or less), a larger amount of resistance change AΔR could be obtained.

In order to function as a spin-valve MR device, the first magnetization fixed film 231 and the second magnetization fixed film 233 are required to be antiferromagnetically exchange coupled to each other through the non-magnetic film 232. However, as the content of the added material X in the second magnetization fixed film 233 increases, spin scattering becomes active, and the amount of resistance change AΔR is improved, but magnetization M(AP2) declines. The magnetization M(AP2) in the second magnetization fixed film 233 is desired to be substantially the same as magnetization M(AP1) in the first magnetization fixed film 231 to which the second magnetization fixed film 233 is exchange coupled. In reality, the total sum of magnetization in consideration of volume in the second magnetization fixed film 233 is required only to be equal to that in the first magnetization fixed film 231, so the following formula is established.

$$M(AP1) \times t(AP1) = M(AP2) \times t(AP2)$$

Herein, t(AP1) represents the thickness of the first magnetization fixed film 231, and t(AP2) represents the thickness of the second magnetization fixed film 233. Therefore, the thickness t(AP2) may increase, when the magnetization M(AP2) declines by an increase in the content of the added material X. However, when the thickness t(AP2) increases, the interface roughness increases, thereby antiferromagnetic exchange coupling becomes difficult, so the thickness t(AP2) is limited to approximately 1.5 times larger than the thickness t(AP1). Therefore, it is considered that the upper limit of the magnetization M(AP2) is approximately 930×10$^3$ A/m(=930 emu/cm$^3$). Relationships between the content of the added material X and the magnetization M(AP2) in Examples 1 and 2 are shown in FIGS. 16A and 16B.

Figure 16A:
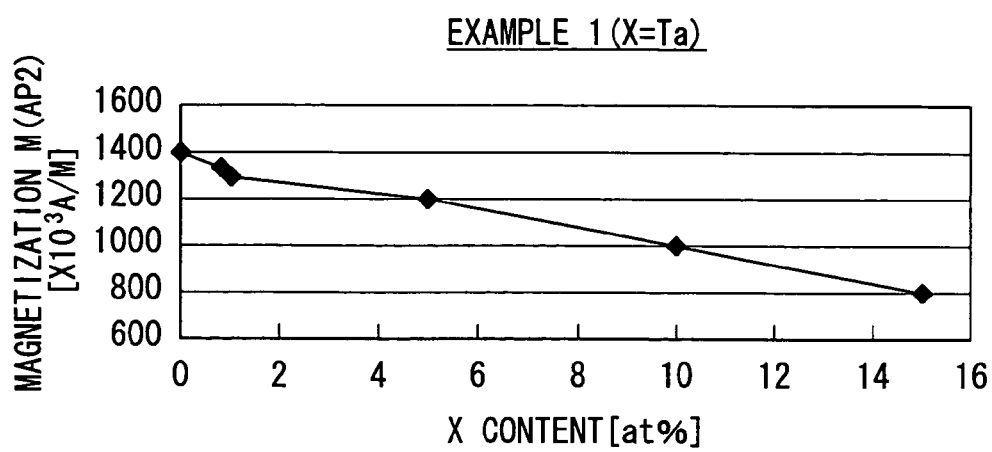
FIGS. 16A and 16B are plots showing a relationship between an added material and magnetization in a second magnetization fixed film in a first example (Example 1) and a second example (Example 2) of the invention.
Figure 16B:
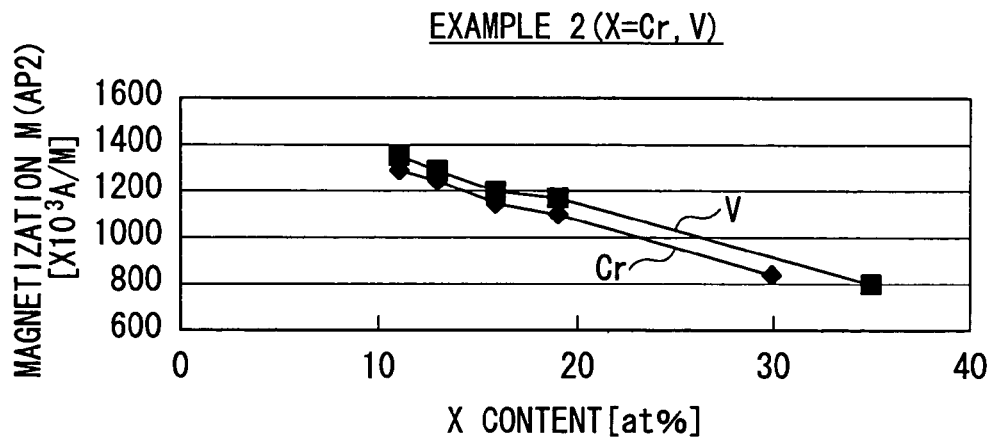

In FIGS. 16A and 16B, the horizontal axis represents the content of the added material X [at %], and the vertical axis represents the magnetization M(AP2) [×10$^3$ A/m]. From the results shown in FIGS. 16A and 16B, the content of the added material X corresponding to the upper limit of the magnetization M(AP2) of 930×10$^3$ A/m is 11.8 at % in the case of tantalum, 26.5 at % in the case of chromium, and 29.4 at % in the case of vanadium. Therefore, it was found out from the results shown in Tables 1 and 2, and FIGS. 16A and 16B that a preferable range of the content of the added material X was within a range of 1.0 at % to 11.8 at % in the case of tantalum, 13 at % to 26.5 at % in the case of chromium and 13 at % to 29.4 at % in the case of vanadium.

Next, as a fourth example of the invention, a relationship between the structure of the second magnetization fixed film 233 and a characteristic value of the MR device 10 comprising the second magnetization fixed film 233 was considered, and its description will be given below.

Six MR devices 10 with different structures shown in Table 5 (Examples 4-1 through 4-6) were prepared. Table 5 shows the detailed film structure (material and thickness) of each example.

TABLE 5

UNIT: Å(0.1 nm)

| | EXAMPLE | | | | | | | | | | | |
|---|---|---|---|---|---|---|---|---|---|---|---|---|
| | 4-1 | | 4-2 | | 4-3 | | 4-4 | | 4-5 | | 4-6 | |
| CAP LAYER | Ta | 30 | Ta | 30 | Ta | 30 | Ta | 30 | Ta | 30 | Ta | 30 |
| | Cu | 50 | Cu | 50 | Cu | 50 | Cu | 50 | Cu | 50 | Cu | 50 |

TABLE 5-continued

UNIT: Å(0.1 nm)

| | EXAMPLE | | | | | | | | | | |
|---|---|---|---|---|---|---|---|---|---|---|---|
| | 4-1 | | 4-2 | | 4-3 | | 4-4 | | 4-5 | | 4-6 |
| DUAL SV LAYER | — | | — | | — | | — | | — | | CoFe 10 |
| | | | | | | | | | | | Cr 2 |
| | | | | | | | | | | | Co 10 |
| | | | | | | | | | | | Cr 2 |
| | | | | | | | | | | | Co 10 |
| | | | | | | | | | | | Cr 2 |
| | | | | | | | | | | | CoFe 10 |
| | | | | | | | | | | | Ru 8 |
| | | | | | | | | | | | CoFe 10 |
| | | | | | | | | | | | Cu 2 |
| | | | | | | | | | | | CoFe 13 |
| | | | | | | | | | | | Cu 2 |
| | | | | | | | | | | | CoFe 13 |
| | | | | | | | | | | | Cu 2 |
| | | | | | | | | | | | CoFe 10 |
| | | | | | | | | | | | Cu 30 |
| | | | | | | | | | | | CoFe 10 |
| MAGNETIZATION FREE LAYER | NiFe | 30 | NiFe | 30 | NiFe | 30 | NiFe | 30 | NiFe | 30 | NiFe 30 |
| | CoFe | 10 | CoFe | 10 | CoFe | 10 | CoFe | 10 | CoFe | 10 | CoFe 10 |
| INTERMEDIATE LAYER | Cu | 30 | Cu | 30 | Cu | 30 | Cu | 30 | Cu | 30 | Cu 30 |
| FIRST MAGNETIZATION FIXED FILM | CoFe | 45 | CoFe | 45 | CoFe | 45 | CoFe | 10 | CoFe | 10 | CoFe 10 |
| | | | | | | | Cu | 2 | Cu | 2 | Cu 2 |
| | | | | | | | CoFe | 13 | CoFe | 13 | CoFe 13 |
| | | | | | | | Cu | 2 | Cu | 2 | Cu 2 |
| | | | | | | | CoFe | 13 | CoFe | 13 | CoFe 13 |
| | | | | | | | Cu | 2 | Cu | 2 | Cu 2 |
| | | | | | | | CoFe | 10 | CoFe | 10 | CoFe 10 |
| NON-MAGNETIC FILM | Ru | 8 | Ru | 8 | Ru | 8 | Ru | 8 | Ru | 8 | Ru 8 |
| SECOND MAGNETIZATION FIXED FILM | CoFe | 40 | CoFe | 10 | CoFe | 10 | CoFe | 10 | CoFe | 10 | CoFe 10 |
| | | | Cr | 2 | Cr | 2 | Cr | 2 | Cr | 2 | Cr 2 |
| | | | CoFe | 10 | Co | 10 | Co | 10 | FeCr | 10 | Co 10 |
| | | | Cr | 2 | Cr | 2 | Cr | 2 | Cr | 2 | Cr 2 |
| | | | CoFe | 10 | Co | 10 | Co | 10 | FeCr | 10 | Co 10 |
| | | | Cr | 2 | Cr | 2 | Cr | 2 | Cr | 2 | Cr 2 |
| | | | CoFe | 10 | CoFe | 10 | CoFe | 10 | CoFe | 10 | CoFe 10 |
| ANTIFERROMAGNETIC LAYER | IrMn | 70 | IrMn | 70 | IrMn | 70 | IrMn | 70 | IrMn | 70 | IrMn 70 |
| BASE LAYER | NiFeCr | 50 | NiFeCr | 50 | NiFeCr | 50 | NiFeCr | 50 | NiFeCr | 50 | NiFeCr 50 |
| | Ta | 10 | Ta | 10 | Ta | 10 | Ta | 10 | Ta | 10 | Ta 10 |
| MR RATIO % | | 0.9 | | 1.5 | | 1.7 | | 2.1 | | 2.2 | 2.7 |
| STANDARDIZATION REPRODUCING OUTPUT | | 1.0 | | — | | — | | 2.5 | | 2.6 | — |

As shown in Table 5, the MR device 10 of Example 4-1 had a structure as a base for the structures of other five MR devices 10 (Examples 4-2 through 4-6), and in Example 4-1, the second magnetization fixed film 233 had a single-layer structure made of CoFe. Example 4-2 had the same structure as that in Example 4-1, except that the second magnetization fixed film 233 had a seven-layer structure of "CoFe/Cr/CoFe/Cr/CoFe/Cr/CoFe". Example 4-3 had the same structure as that in Example 4-1, except that the second magnetization fixed film 233 had a seven-layer structure of "CoFe/Cr/Co/Cr/Co/Cr/CoFe". Example 4-4 had the same structure as that in Example 4-3, except that the first magnetization fixed film 231 had a seven-layer structure of "CoFe/Cu/CoFe/Cu/CoFe/Cu/CoFe". Example 4-5 had the same structure as that in Example 4-4, except that the second magnetization fixed film 233 had a seven-layer structure of "CoFe/Cr/FeCr/Cr/FeCr/Cr/CoFe". Example 4-6 had a dual spin-valve structure based on the structure in Example 4-3. As an evaluation item, the magnetoresistive ratio (MR ratio) was used. The magnetoresistive ratio was a ratio ΔR/R between device resistance R and the amount of resistance change ΔR relative to a change in a magnetic field. In terms of the characteristics of the MR device, the magnetoresistive ratio is preferably large.

The bottom electrode 11 and the top electrode 14 in the MR device 10 used for measurement were made of NiFe. The pattern size of the MR film 20 which was pattern-processed by milling was 0.1 μm×0.1 μm. In the forming process of the MR film 20, sputtering was used, and a heat treatment was carried out at 270° C. for four hours to fix the magnetization direction of the second magnetization fixed film 233.

As shown in Table 5, a chromium film was inserted into the second magnetization fixed film 233 to have a seven-layer structure, thereby the magnetoresistive ratio was increased from 0.9% (Example 4-1) to 1.5% (Example 4-2). The reason why the magnetoresistive ratio was improved by inserting the chromium film was that a negative interface scattering coefficient γ (for example, −0.14±0.03) was generated between the chromium film and the CoFe film. A relative angle between the magnetization direction of the first magnetization fixed film 231 and the magnetization direction of the magnetization free layer 25 and a relative angle between the magnetization direction of the second magnetization fixed film 233 and the magnetization direction of the magnetization free layer 25 were displaced 180° with respect to each other, and they were diametrically opposed to each other, so basically, only a negative resistance change occurred in the second magnetization fixed film 233. However, in Example 4-2, a negative interface scattering coefficient γ was generated between the chromium film and the CoFe film, so as a result, "a positive resistance change" could be obtained. Therefore, in Example 4-2, a larger magnetoresistive ratio could be obtained as a whole.

In a CPP-GMR device in which a sense current flows in a laminate direction, two effects, that is, interface scattering which occurs in an interface between films and balk scattering which occurs in a film contribute to a magnetoresistive effect. In this case, it could be considered that the bulk scattering coefficient β of the chromium film was positive, so a contribution of bulk scattering to "a negative resistance change" exceeded a contribution of interface scattering to "a positive resistance change", thereby only a negative resistance change occurred. However, in reality, an interface scattering effect exceeding the contribution of bulk scattering to "a negative resistance change" could be obtained through increasing the number of inserted chromium films, thereby "a positive resistance change" could be obtained as a whole. Therefore, as shown in Example 4-2, it could be considered that when three layers of chromium films were inserted into the structure in Example 4-1, the magnetoresistive ratio could be largely improved.

In Example 4-3, cobalt films instead of the CoFe films were sandwiched between the chromium films in the second magnetization fixed film 233. The reason why the cobalt films were used was that as in the case of the CoFe films, it was known that a negative interface scattering coefficient γ (for example, −0.24±0.17) was generated between the cobalt film and the chromium film. In the second magnetization fixed film 233, the CoFe film was used in portions in contact with the antiferromagnetic layer 22 and the non-magnetic film 232 so as to maintain an exchange coupling magnetic field with the antiferromagnetic layer 22 and antiferromagnetic coupling with the first magnetization fixed film 231 through the non-magnetic film 232. When the second magnetization fixed film 233 had such a structure, the magnetoresistive ratio was improved more than that in Example 4-2, and was 1.7%.

In Example 4-4, on the basis of the structure in Example 4-3, a plurality of copper (Cu) films were inserted into the first magnetization fixed film 231 so as to increase the number of interfaces, thereby to improve the interface scattering effect. The copper films had a positive interface scattering coefficient γ, so the copper films were preferably inserted into the first magnetization fixed film 231, but not into the second magnetization fixed film 233. When three copper films were inserted into the first magnetization fixed film 231, the magnetoresistive ratio was increased to 2.1%, thereby a further improvement was confirmed.

The thicknesses of the copper films were 0.2 nm in this case, but a preferable range is from 0.1 nm to 0.5 nm inclusive. When the copper films have a thickness of less than 0.1 nm, it is difficult to stably manufacture the copper films. On the other hand, the upper limit of the thicknesses of the copper films is set to 0.5 nm, because when the copper films has a thickness of larger than 0.5 nm, the total thickness of the first magnetization fixed film 231 increases, thereby an exchange coupling force to the second magnetization fixed film 233 through the non-magnetic film 232 (for example, a Ru film) declines to cause an undesirable result in terms of magnetic characteristics. Further, it is because the presence of the copper films is important to improve the magnetoresistive ratio, and an increase in the thicknesses of the copper films does not have an influence.

In Example 4-5, on the basis of the structure in Example 4-4, FeCr films instead of the cobalt films sandwiched between the chromium films were used in the second magnetization fixed film 233. The FeCr films were used, because it was known that as in the case of the CoFe film and the cobalt film, a negative interface scattering coefficient γ was generated between the FeCr film and the chromium film. When the second magnetization fixed film 233 had such a structure, the magnetoresistive ratio was further improved, and was 2.2%.

In Example 4-6, on the basis of the structure in Example 4-4, the MR device 10 comprised a second magnetization fixed layer in which a third magnetization fixed film, a second non-magnetic film and a fourth magnetization fixed film were laminated in order from the magnetization free layer 25 so as to face the first magnetization fixed layer 231 with the magnetization free layer 25 in between, and had a dual spin-valve structure as a whole. The third magnetization fixed film had a magnetization direction fixed in the same direction as that in the first magnetization fixed film 231, and the fourth magnetization fixed film had a magnetization direction fixed in a direction opposite to the magnetization direction of the first magnetization fixed film 231. When the MR device 10 had such a structure, the magnetoresistive ratio was further improved, and was 2.7%.

The MR device of the invention is not limited to the MR devices with the above film structures. For example, CoFe with a Fe-richer composition than $Co_{50}Fe_{50}$ may be used for the first magnetization fixed layer 231 with an emphasis on bulk scattering. Moreover, one layer or two or more layers of copper films may be inserted into the magnetization free layer 25.

Moreover, the standardization reproducing outputs of the thin film magnetic heads comprising the MR devices 10 of Examples 4-1, 4-4 and 4-5 were measured so as to verify their performance. The pattern size of the MR film 20 was 0.1 μm×0.1 μm, and a sense current of 5 mA flew through the MR film 20. In this case, the reproducing output in Example 4-1 was standardized as 1, and the reproducing outputs in Examples 4-4 and 4-5 were shown as relative values. As a result, it was confirmed that the results matched characteristics (the magnetoresistive ratio) as the MR device.

Next, the influence of the thicknesses of the chromium films included in the second magnetization fixed film 233 in Example 4-2 was considered. In this case, MR devices including chromium films with a thickness of 0.1 nm, 0.2 nm, 0.3 nm and 0.5 nm were formed, and the magnetoresistive ratio of each MR device was measured. Table 6 shows the magnetoresistive ratio corresponding to the film structure (material and the thickness).

TABLE 6

UNIT: Å(0.1 nm)

| | | EXAMPLE | | | |
|---|---|---|---|---|---|
| | | 4-2-1 | 4-2-2 | 4-2-3 | 4-2-4 |
| CAP LAYER | Ta | 30 | 30 | 30 | 30 |
| | Cu | 50 | 50 | 50 | 50 |
| MAGNETIZATION FREE LAYER | NiFe | 30 | 30 | 30 | 30 |
| | CoFe | 10 | 10 | 10 | 10 |
| INTERMEDIATE LAYER | Cu | 30 | 30 | 30 | 30 |
| FIRST MAGNETIZATION FIXED FILM | CoFe | 45 | 45 | 45 | 45 |
| NON-MAGNETIC FILM | Ru | 8 | 8 | 8 | 8 |
| SECOND MAGNETIZATION FIXED FILM | CoFe | 10 | 10 | 10 | 10 |
| | Cr | 1 | 2 | 3 | 5 |
| | CoFe | 10 | 10 | 10 | 10 |
| | Cr | 1 | 2 | 3 | 5 |
| | CoFe | 10 | 10 | 10 | 10 |
| | Cr | 1 | 2 | 3 | 5 |
| | CoFe | 10 | 10 | 10 | 10 |

TABLE 6-continued

UNIT: Å(0.1 nm)

| | | EXAMPLE | | | |
|---|---|---|---|---|---|
| | | 4-2-1 | 4-2-2 | 4-2-3 | 4-2-4 |
| ANTIFERROMAGNETIC LAYER | IrMn | 70 | 70 | 70 | 70 |
| BASE LAYER | NiFeCr | 50 | 50 | 50 | 50 |
| | Ta | 10 | 10 | 10 | 10 |
| MR RATIO % | | 1.4 | 1.5 | 1.5 | 1.4 |

Likewise, MR devices with the structure of Example 4-3 in which the chromium films included in the second magnetization fixed film 233 had a thickness of 0.1 nm, 0.2 nm, 0.3 nm and 0.5 nm were formed, and the magnetoresistive ratio of each MR device was measured. Table 7 shows the magnetoresistive ratio corresponding to the film structure (material and the thickness).

TABLE 7

UNIT: Å(0.1 nm)

| | | EXAMPLE | | | |
|---|---|---|---|---|---|
| | | 4-3-1 | 4-3-2 | 4-3-3 | 4-3-4 |
| CAP LAYER | Ta | 30 | 30 | 30 | 30 |
| | Cu | 50 | 50 | 50 | 50 |
| MAGNETIZATION FREE LAYER | NiFe | 30 | 30 | 30 | 30 |
| | CoFe | 10 | 10 | 10 | 10 |
| INTERMEDIATE LAYER | Cu | 30 | 30 | 30 | 30 |
| FIRST MAGNETIZATION FIXED FILM | CoFe | 45 | 45 | 45 | 45 |
| NON-MAGNETIC FILM | Ru | 8 | 8 | 8 | 8 |
| SECOND MAGNETIZATION FIXED FILM | CoFe | 10 | 10 | 10 | 10 |
| | Cr | 1 | 2 | 3 | 5 |
| | Co | 10 | 10 | 10 | 10 |
| | Cr | 1 | 2 | 3 | 5 |
| | Co | 10 | 10 | 10 | 10 |
| | Cr | 1 | 2 | 3 | 5 |
| | CoFe | 10 | 10 | 10 | 10 |
| ANTIFERROMAGNETIC LAYER | IrMn | 70 | 70 | 70 | 70 |
| BASE LAYER | NiFeCr | 50 | 50 | 50 | 50 |
| | Ta | 10 | 10 | 10 | 10 |
| MR RATIO % | | 1.6 | 1.7 | 1.7 | 1.6 |

Moreover, MR devices with the structure of Example 4-4 in which the chromium films included in the second magnetization fixed film 233 had a thickness of 0.1 nm, 0.2 nm, 0.3 nm and 0.5 nm, and the copper films included in the first magnetization fixed film 231 had a thickness of 0.1 nm, 0.2 nm, 0.3 nm and 0.5 nm were formed, and the magnetoresistive ratio of each MR device was measured. Table 8 shows the magnetoresistive ratio corresponding to the film structure (material and the thickness).

TABLE 8

UNIT: Å(0.1 nm)

| | | EXAMPLE | | | |
|---|---|---|---|---|---|
| | | 4-4-1 | 4-4-2 | 4-4-3 | 4-4-4 |
| CAP LAYER | Ta | 30 | 30 | 30 | 30 |
| | Cu | 50 | 50 | 50 | 50 |
| MAGNETIZATION FREE LAYER | NiFe | 30 | 30 | 30 | 30 |
| | CoFe | 10 | 10 | 10 | 10 |
| INTERMEDIATE LAYER | Cu | 30 | 30 | 30 | 30 |

TABLE 8-continued

UNIT: Å(0.1 nm)

| | | EXAMPLE | | | |
|---|---|---|---|---|---|
| | | 4-4-1 | 4-4-2 | 4-4-3 | 4-4-4 |
| FIRST MAGNETIZATION FIXED FILM | CoFe | 10 | 10 | 10 | 10 |
| | Cu | 1 | 2 | 3 | 5 |
| | CoFe | 12.5 | 12.5 | 12.5 | 12.5 |
| | Cu | 1 | 2 | 3 | 5 |
| | CoFe | 12.5 | 12.5 | 12.5 | 12.5 |
| | Cu | 1 | 2 | 3 | 5 |
| | CoFe | 10 | 10 | 10 | 10 |
| NON-MAGNETIC FILM | Ru | 8 | 8 | 8 | 8 |
| SECOND MAGNETIZATION FIXED FILM | CoFe | 10 | 10 | 10 | 10 |
| | Cr | 1 | 2 | 3 | 5 |
| | Co | 10 | 10 | 10 | 10 |
| | Cr | 1 | 2 | 3 | 5 |
| | Co | 10 | 10 | 10 | 10 |
| | Cr | 1 | 2 | 3 | 5 |
| | CoFe | 10 | 10 | 10 | 10 |
| ANTIFERROMAGNETIC LAYER | IrMn | 70 | 70 | 70 | 70 |
| BASE LAYER | NiFeCr | 50 | 50 | 50 | 50 |
| | Ta | 10 | 10 | 10 | 10 |
| MR RATIO % | | 2.0 | 2.1 | 2.1 | 2.0 |

It was confirmed from the results shown in Tables 6 through 8 that the influence of the thicknesses of the chromium films on the magnetoresistive ratio was small in all cases. In other words, it was confirmed that the presence or the absence of the chromium films was important. Further, in Example 4-4, the magnetoresistive ratios in the case where only the thicknesses of the copper films were changed to 0.1 nm, 0.2 nm, 0.3 nm and 0.5 nm were determined. However, substantially the same results as those in Table 8 were obtained. Therefore, as in the case of the chromium films, it was confirmed that the influence of the thicknesses of the copper films on the magnetoresistive ratio was small, and the presence and the absence of the copper films was important.

Thus, it was confirmed that when the chromium (Cr) films were inserted into the second magnetization fixed film, "a positive resistance change" occurred in the second magnetization fixed film, thereby a larger magnetoresistive ratio was obtained as a whole.

Although the present invention is described referring to the embodiment and some examples, the invention is not limited to them, and is variously modified. For example, in the embodiment and the examples, the MR device with a bottom type synthetic spin-valve structure is described, but the invention is not limited to this, and the invention may be applied to a MR device with a top type synthetic spin-valve structure. Moreover, the invention may be applied to either a single spin-valve MR device or a dual spin-valve MR device. In the case of the dual spin-valve MR device, when a magnetization fixed film farther from the magnetization free layer out of two magnetization fixed films in each magnetization fixed layer is made of a material with a bulk scattering coefficient of 0.25 or less, a higher magnetoresistive ratio can be obtained, and the MR device can respond to a higher recording density.

Obviously many modifications and variations of the present invention are possible in the light of the above teachings. It is therefore to be understood that within the scope of the appended claims the invention may be practiced otherwise than as specifically described.

What is claimed is:

1. A magnetoresistive device, comprising:
   a first magnetization fixed layer including a first magnetization fixed film having a magnetization direction fixed in a predetermined direction and a second magnetization fixed film being antiferromagnetically coupled to the first magnetization fixed film and having a bulk scattering coefficient of 0 to 0.25;

a magnetization free layer being disposed on a side of the first magnetization fixed film opposite to a side where the second magnetization fixed film is disposed, and having a magnetization direction changing depending upon an external magnetic field; and a current path for flowing a sense current through the first magnetization fixed layer and the magnetization free layer in a direction perpendicular to a laminate surface.

2. A magnetoresistive device according to claim 1, wherein the second magnetization fixed film has a bulk scattering coefficient of 0 to 0.20.

3. A magnetoresistive device according to claim 1, further comprising:

an antiferromagnetic layer being disposed on a side of the second magnetization fixed film opposite to a side where the first magnetization fixed film is disposed so as to fix the magnetization direction of the second magnetization fixed film.

4. A magnetoresistive device according to claim 1, wherein the second magnetization fixed film includes at least one selected from the group consisting of tantalum (Ta), chromium (Cr) and vanadium (V).

5. A magnetoresistive device according to claim 4, wherein the tantalum (Ta) content is within a range of 1 atom percent to 11.8 atom percent inclusive of the second magnetization fixed film.

6. A magnetoresistive device according to claim 4, wherein the chromium (Cr) content is within a range of 13 atom percent to 26.5 atom percent inclusive of the second magnetization fixed film.

7. A magnetoresistive device according to claim 4, wherein the vanadium (V) content is within a range of 13 atom percent to 29.4 atom percent inclusive of the second magnetization fixed film.

8. A magnetoresistive device according to claim 4, wherein the second magnetization fixed film further includes at least one selected from the group consisting of iron (Fe), cobalt (Co), nickel (Ni) and manganese (Mn).

9. A magnetoresistive device according to claim 8, wherein the composition ratio between cobalt and iron is 9:1.

10. A magnetoresistive device according to claim 4, further comprising:

an antiferromagnetic layer being disposed on a side of the second magnetization fixed film opposite to a side where the first magnetization fixed film is disposed so as to fix the magnetization direction of the second magnetization fixed film.

11. A magnetoresistive device according to claim 4, wherein the second magnetization fixed film includes at least one chromium (Cr) film with a thickness of 0.1 nm to 0.5 nm inclusive.

12. A magnetoresistive device according to claim 4, wherein in the second magnetization fixed film, a plurality of chromium (Cr) films and a plurality of ferromagnetic films are alternately laminated, and the plurality of ferromagnetic films are any one of cobalt iron alloy (CoFe) films, cobalt (Co) films and iron chromium alloy (FeCr) films.

13. A magnetoresistive device according to claim 4, wherein at least one of the first magnetization fixed film and the magnetization free layer includes at least one copper (Cu) film with a thickness of 0.1 nm to 0.5 nm inclusive.

14. A magnetoresistive device according to claim 4, further comprising:

a second magnetization fixed layer in which a third magnetization fixed film, a second non-magnetic film and a fourth magnetization fixed film are laminated in order from the magnetization free layer so as to face the first magnetization fixed layer with the magnetization free layer in between.

15. A thin film magnetic head, comprising:

a magnetoresistive device facing a magnetic recording medium on which magnetic information is recorded so as to detect the magnetic information, wherein the magnetoresistive device comprises:

a first magnetization fixed layer including a first magnetization fixed film having a magnetization direction fixed in a predetermined direction and a second magnetization fixed film being antiferromagnetically coupled to the first magnetization fixed film and having a bulk scattering coefficient of 0 to 0.25;

a magnetization free layer being disposed on a side of the first magnetization fixed film opposite to a side where the second magnetization fixed film is disposed, and having a magnetization direction changing depending upon an external magnetic field; and a current path for flowing a sense current through the first magnetization fixed layer and the magnetization free layer in a direction perpendicular to a laminate surface.

16. A thin film magnetic head according to claim 15, wherein the second magnetization fixed film includes at least one selected from the group consisting of tantalum (Ta), chromium (Cr) and vanadium (V).

17. A head gimbal assembly, comprising:

a magnetic head slider including a thin film magnetic head on a side of the magnetic head slider, the thin film magnetic head including a plurality of magnetoresistive devices facing a magnetic recording medium on which magnetic information is recorded so as to detect the magnetic information; and a suspension to which the magnetic head slider is attached at an end thereof, wherein the magnetoresistive device comprises:

a first magnetization fixed layer including a first magnetization fixed film having a magnetization direction fixed in a predetermined direction and a second magnetization fixed film being antiferromagnetically coupled to the first magnetization fixed film and having a bulk scattering coefficient of 0 to 0.25;

a magnetization free layer being disposed on a side of the first magnetization fixed film opposite to a side where the second magnetization fixed film is disposed, and having a magnetization direction changing depending upon an external magnetic field; and a current path for flowing a sense current through the first magnetization fixed layer and the magnetization free layer in a direction perpendicular to a laminate surface.

18. A head gimbal assembly according to claim 17, wherein the second magnetization fixed film including at least one selected from the group consisting of tantalum (Ta), chromium (Cr) and vanadium (V).

19. A magnetic disk unit, comprising:

a magnetic recording medium; and a head arm assembly, wherein the head arm assembly comprises:

a magnetic head slider including a thin film magnetic head on a side of the magnetic head slider, the thin film magnetic head including a plurality of magnetoresistive devices facing a magnetic recording medium on which magnetic information is recorded so as to detect the magnetic information;

a suspension to which the magnetic head slider is attached at an end thereof; and an arm supporting the other end of suspension, and the magnetoresistive device comprises:

a first magnetization fixed layer including a first magnetization fixed film having a magnetization direction fixed in a predetermined direction and a second magnetization fixed film being antiferromagnetically coupled to the first magnetization fixed film and having a bulk scattering coefficient of 0 to 0.25;

a magnetization free layer being disposed on a side of the first magnetization fixed film opposite to a side where the second magnetization fixed film is disposed, and having a magnetization direction changing depending upon an external magnetic field; and a current path for flowing a sense current through the first magnetization fixed layer and the magnetization free layer in a direction perpendicular to a laminate surface.

20. A magnetic disk unit according to claim 19, wherein the second magnetization fixed film includes at least one selected from the group consisting of tantalum (Ta), chromium (Cr) and vanadium (V).

* * * * *